(12) United States Patent
Song

(10) Patent No.: US 7,875,833 B2
(45) Date of Patent: Jan. 25, 2011

(54) COFFEE ROASTER AND CONTROLLING METHOD OF SAME

(76) Inventor: Eugene Song, 302-8 Yoen Hee Dong, Seodae Moon-Ku, Seoul (KR)

( * ) Notice: Subject to any disclaimer, the term of this patent is extended or adjusted under 35 U.S.C. 154(b) by 1070 days.

(21) Appl. No.: 11/608,025

(22) Filed: Dec. 7, 2006

(65) Prior Publication Data
US 2008/0089986 A1 Apr. 17, 2008

(30) Foreign Application Priority Data
Oct. 13, 2006 (KR) .................. 10-2006-0099924

(51) Int. Cl.
*F27B 7/00* (2006.01)
*F27B 7/34* (2006.01)
*F27B 7/42* (2006.01)
*A23N 12/10* (2006.01)

(52) U.S. Cl. .............. 219/389; 219/410; 219/411; 219/413; 99/331; 99/348; 99/468; 99/483; 34/63; 34/68

(58) Field of Classification Search .......... None
See application file for complete search history.

(56) References Cited

U.S. PATENT DOCUMENTS

| 4,048,473 A | * | 9/1977 | Burkhart | 219/389 |
| 4,120,981 A | * | 10/1978 | Burkhart | 426/231 |
| 4,683,666 A | * | 8/1987 | Igusa et al. | 34/67 |
| 5,182,981 A | * | 2/1993 | Wilcox | 99/333 |
| 5,193,444 A | * | 3/1993 | Bar-Sheshet | 99/427 |
| 2004/0074400 A1 | * | 4/2004 | Song | 99/483 |

* cited by examiner

*Primary Examiner*—Joseph M Pelham
(74) *Attorney, Agent, or Firm*—Fish & Associates, PC

(57) ABSTRACT

Contemplated fully automated coffee roaster have significantly reduced energy demands, use electrical heat as a heat source in a temperature-only driven program mode, and eliminate smoke and smell within the roaster. Most preferably, contemplated fully automated roasters will consume only about 10 percent of the energy as compared to known devices on a per kilogram basis of beans and require no operator experience.

21 Claims, 20 Drawing Sheets

COFFEE ROASTER AND CONTROLLING METHOD OF SAME

This application claims priority to the Korean national patent application with the serial number 10-2006-0099924, which was filed Oct. 13, 2006.

FIELD OF THE INVENTION

This invention relates to a coffee roaster and controlling methods of same, particularly, to a coffee roaster for economizing in electric power only by using electrical heat as a heat source when roasting coffee beans, eliminating smoke by burning the smoke generated when roasting coffee beans within the device itself and eliminating smell generated when roasting coffee beans, and a method of controlling the same, in which an optimal method for roasting coffee beans is selected in advance and then preset in a micro-computer of a control unit so that inexperienced users can easily roast coffee beans to an optimum state.

BACKGROUND OF THE INVENTION

In general, when using electric power as a heat source for roasting coffee beans, the heat source for roasting 1 kg of coffee beans needs 14 to 20 KW. Thus, if the weight of coffee beans to be roasted is 1 kg or more, gas heating (for example, propane gas and LNG gas) is almost always used. However, gas heating typically requires an expert to predictably roast coffee beans to an predetermined degree.

Further, an important know-how for roasting coffee beans is to find certain points when a first crack sound is generated upon applying the heat to green beans, wherein the first crack sound is failed by reducing the heat after a while, and when the heat is further reduced after a second crack sound is generated again so that the beans have a desired color.

As described above, since the technique of roasting coffee beans is largely depended upon the expert's experience and skill to find the points of the first, second, and third crack sounds and requires increasing or reducing the heat while observing and heating the roasted coffee beans, it generally very difficult, if not even impossible for an inexperienced user to predictably and reliably roast coffee beans to a desired state. Even though new machines for roasting coffee beans using hot air have been developed, resulting roasted coffee is often not satisfactory for the general public. Thus, the coffee roasting industry largely relies on expert roasters.

Further, when roasting the coffee beans, a considerable amount of smoke is generated, which is in heretofore known devices typically discharged to the outside by installing a smoke pipe, or eliminated by installing a large smoke collector (often 5 to 6 times larger as the roasting machine) above the device in combination with an after-burner for burning the smoke collected in a smoke reserve tank (which is also six or more times as large as the roasting machine). Therefore, a very large space is required to roast coffee beans using heretofore known devices. Moreover, a smoke pipe is often essential to discharge the burned gas placing further restriction to general use. Consequently, coffee bean roasting is generally performed only in factories or smaller roasting operations, even when roasting a small amount (several kilogram) of coffee beans.

Therefore, there is still a need to provide improved coffee roasting devices that will allow fully automated operation by an inexperienced user or even novice at significantly reduced power consumption.

SUMMARY OF THE INVENTION

It is, therefore, an object of the present invention to provide a coffee roaster which can efficiently roast coffee beans by using an electrical heater with very small power consumption and eliminate smoke and smell generated when roasting coffee beans, whereby everyone can easily roast coffee beans in the optimum state while maintaining comfortable circumstances in a room.

It is another object of the present invention to provide a coffee roaster which is provided with an equipment for removing the smell and cooling the green beans instead of a separate large-sized equipment so as to be installed at any places and circumstances, and which is provided as a power saving automatic machine like home electronics so that everyone can easily use it.

It is yet another object of the present invention to provide a coffee roaster which is made smaller for saving electricity, in which an electric heater is appropriately disposed so as to be capable of removing the smoke and providing the additional heating, and in which an open air coil heater, a ceramic heater and sheath heater are disposed at the outside of a rotating drum, and in which a halogen lamp heater for directly transferring heat to the beans is installed within the drum to increase thermal efficiency.

It is yet another object of the present invention to provide a coffee roaster in which a curved reflector is installed at the upper side of the halogen lamp heater to protect the halogen lamp heater and to reflect light downwardly.

It is yet another object of the present invention to provide a coffee roaster provided with a multi-step smoke eliminator assembly in which a coil heater is wound up in a spiral shape within a ceramic base through which smoke generated in the rotating drum is smoothly guided and then completely burned at high temperature (about 700~1000° C.) while passing along the heat coil.

It is yet another object of the present invention to provide a coffee roaster in which water is injected into the rotating drum so that steam is generated by the heat of the rotating drum and the roasted beans, and the smoke is pushed out by the steam and then completely removed by a smoke eliminator and a deodorizer (typically activated charcoal filter).

In order to accomplish these and other objects, a coffee roaster according to the present invention comprises a casing of a coffee roaster assembly; a rotating drum which is installed in the casing to roast beans; a drum shield for surrounding an outer surface of the rotating drum; heating elements, including a halogen lamp heater which is installed in the rotating drum to heat the rotating drum and beans, an open air coil heater assembly which is installed at an upper part of the drum shield and a ceramic heater and a sheath heater which are respectively installed at the sides of the drum shield; a first sensor for bean temperature which is disposed at an inside of the rotating drum to measure a temperature of the beans; a second sensor for drum temperature which measures an inner temperature of the rotating drum; a memory element for storing data values of temperatures of the beans and the rotating drum, which are measured by the first sensor for bean temperature and the second sensor for drum temperature in a desired time after points of first and second cracks; and a control unit for automatically adjusting the roasting of beans by reducing the inner temperature of the rotating drum by controlling the heating means when the temperatures of the beans and the rotating drum arrive at the data values.

According to the present invention, a method of controlling a coffee roaster comprises a first step of previously storing data values of an inner temperature of a rotating drum and a temperature of beans, which are measured in a desired time after first and second cracks are occurred, in a memory; a second step of determining whether the inner temperature of the rotating drum and the temperature of beans arrive at the stored data values; and a third step of controlling heating means to reduce the inner temperature of the rotating drum if the inner temperature of the rotating drum and the temperature of beans arrive at the stored data values. In especially preferred aspects, the control operation is exclusively achieved by adjusting the temperature settings (and not by including time as a determinant in the roasting process).

Various objects, features, aspects and advantages of the present invention will become more apparent from the following detailed description of preferred embodiments of the invention.

DETAILED DESCRIPTION

In a preferred embodiment of the present invention, there is disclosed a rotating drum type coffee roaster using electric heat for roasting 5 kg of green beans. Also, "green beans" means beans before being completely roasted in a rotating drum, and "coffee beans" means beans that are completely roasted in the rotating drum.

In a coffee roaster according to the present invention, an electric heater which can simply and precisely control the temperature is used as a heat source so that everyone can easily roast coffee beans, electricity consumption is reduced, and heat efficiency is enhanced by employing an array of the electric heaters and heat distribution devices/schemes. Further, the size of the rotating drum is decreased relative to known roaster drums for equivalent amounts of green beans to further reduce power consumption as well as to increase heat efficiency.

In heretofore known devices, a conventional coffee roaster is provided with a large fin in the rotating drum. In contrast, contemplated devices include a thin spiral strip on an inner surface of rotating drum to evenly mix the coffee beans by operating the rotating drum in a clockwise or counter-clockwise direction, thereby reducing the size of the rotating drum and thus maximizing the power saving.

Further, according to the present invention, the open air coil heater assembly is disposed at an upper side of the rotating drum so that, when smoke generated from the coffee beans in the roasting process rises upwardly, the open air coil heater assembly heats and burns the collected smoke and thus the smoke is more easily burned in a second step smoke eliminator. Further, the outer surface of the rotating drum is heated to support the roasting process.

Additionally, one or more ceramic heaters are disposed on the surfaces of the upper end of the rotating drum to heat an upper side of the rotating drum so that oil runs out of the coffee beans, thereby improving a taste for coffee. A halogen lamp heater is positioned (on a preferably central upper part) within the rotating drum to directly heat the coffee beans. The above array of the heaters are made in view of maximizing power saving.

Figure 1:
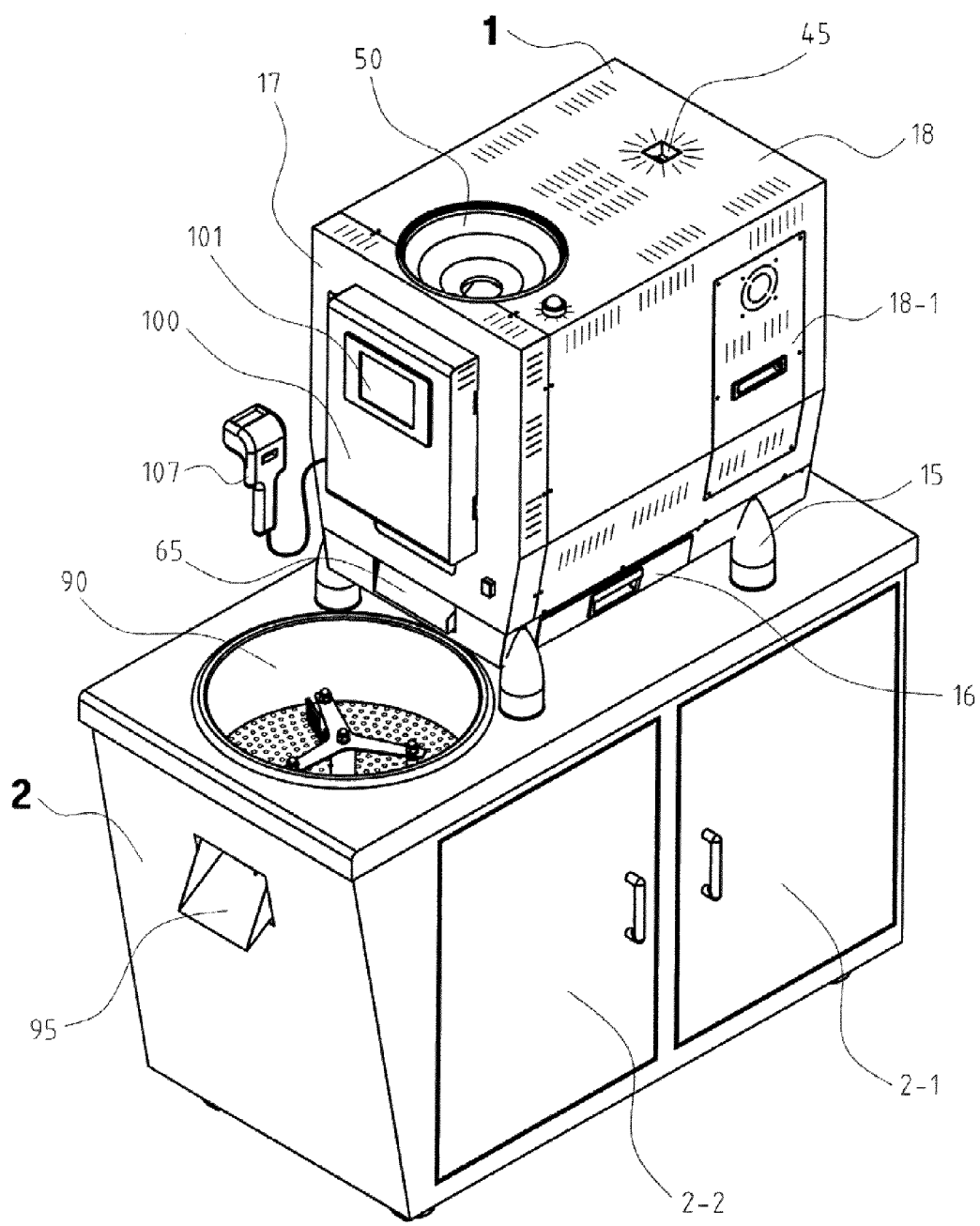
FIG. 1 is a front perspective view showing an exemplary coffee roaster assembly and an exemplary cooling table assembly according to the present invention.
Figure 7:
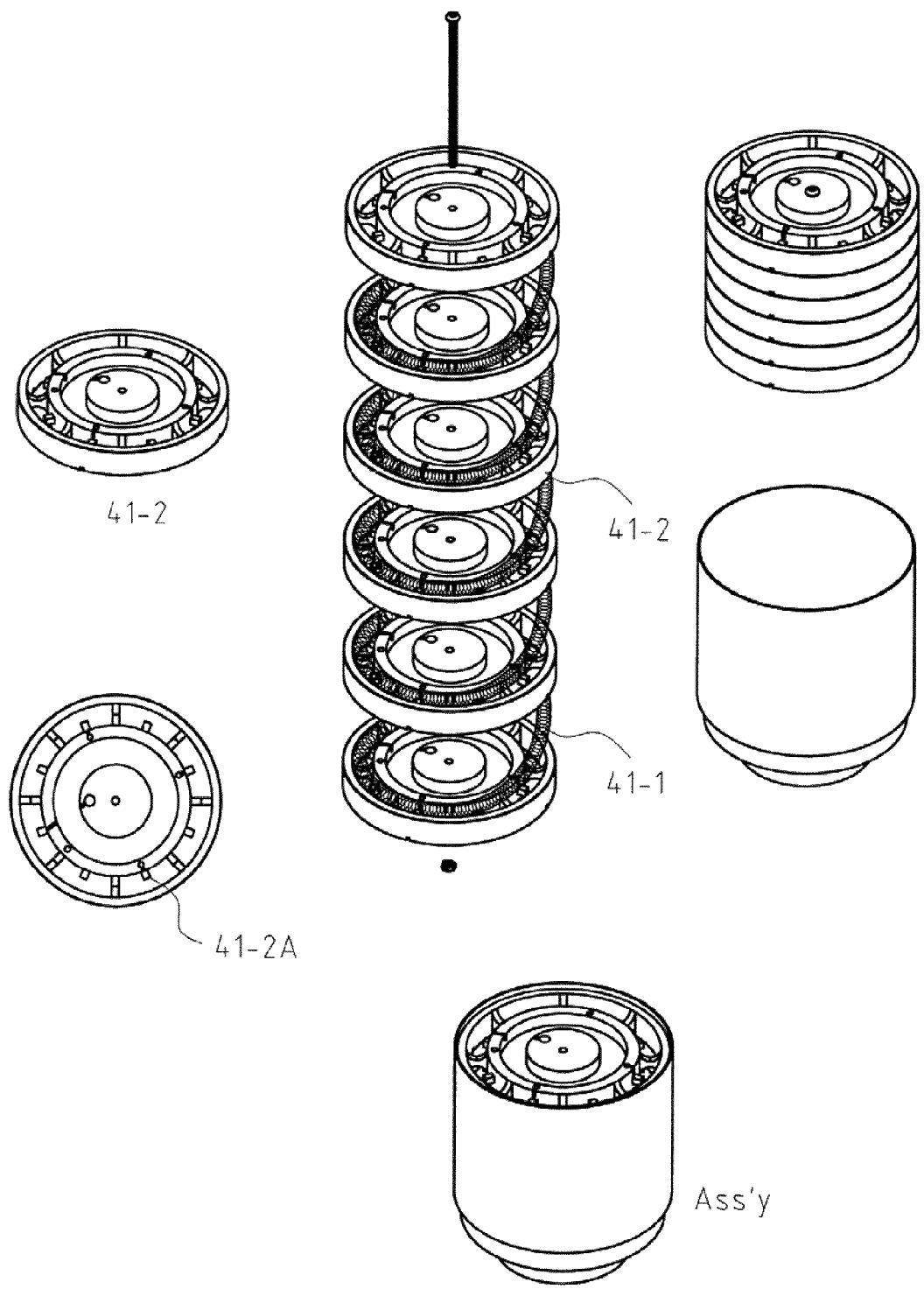
FIG. 7 is an exploded perspective view showing the smoke eliminator assembly of the coffee roaster according to the present invention.

The present invention includes a built-in type compact smoke eliminator 40. As shown in FIGS. 7 and 1, first and second step smoke eliminator assemblies 41 and 42 of the smoke eliminator 40 includes ceramic bases 41-2 and 42-2 which are piled up in multiple stages, spiral coil heaters 41-1 and 42-1 which are respectively wound up in a spiral shape within the ceramic bases 41-2 and 42-2, and ceramic heater cases 41-3 and 42-3 in which the assembly of the ceramic bases 41-2 and 42-2 and spiral coil heaters 41-1 and 42-1 is installed.

By the spiral type installation of the spiral coil heaters 41-1 and 42-1 in the ceramic bases 41-2 and 42-2, the smoke is flown smoothly and also heated continuously while being risen up along the ceramic bases 41-2 and 42-2, thereby improving the smoke eliminating function. A plurality of upholding bosses 41-3 are formed at the ceramic bases 41-2 and 42-2, in which the spiral coil heaters 41-1 and 42-1 are installed, to prevent a short-circuit between the spiral coil heaters 41-1 and 42-1. Further, since the smoke generated when roasting the coffee beans is completely burned by the first and second step smoke eliminator assembly 41 and 42, a separate smoke pipe is not needed.

Further, in order to remove smell generated at an early stage of the roasting, the present invention employs an activated carbon which functions to remove a bad smell.

Figure 2:
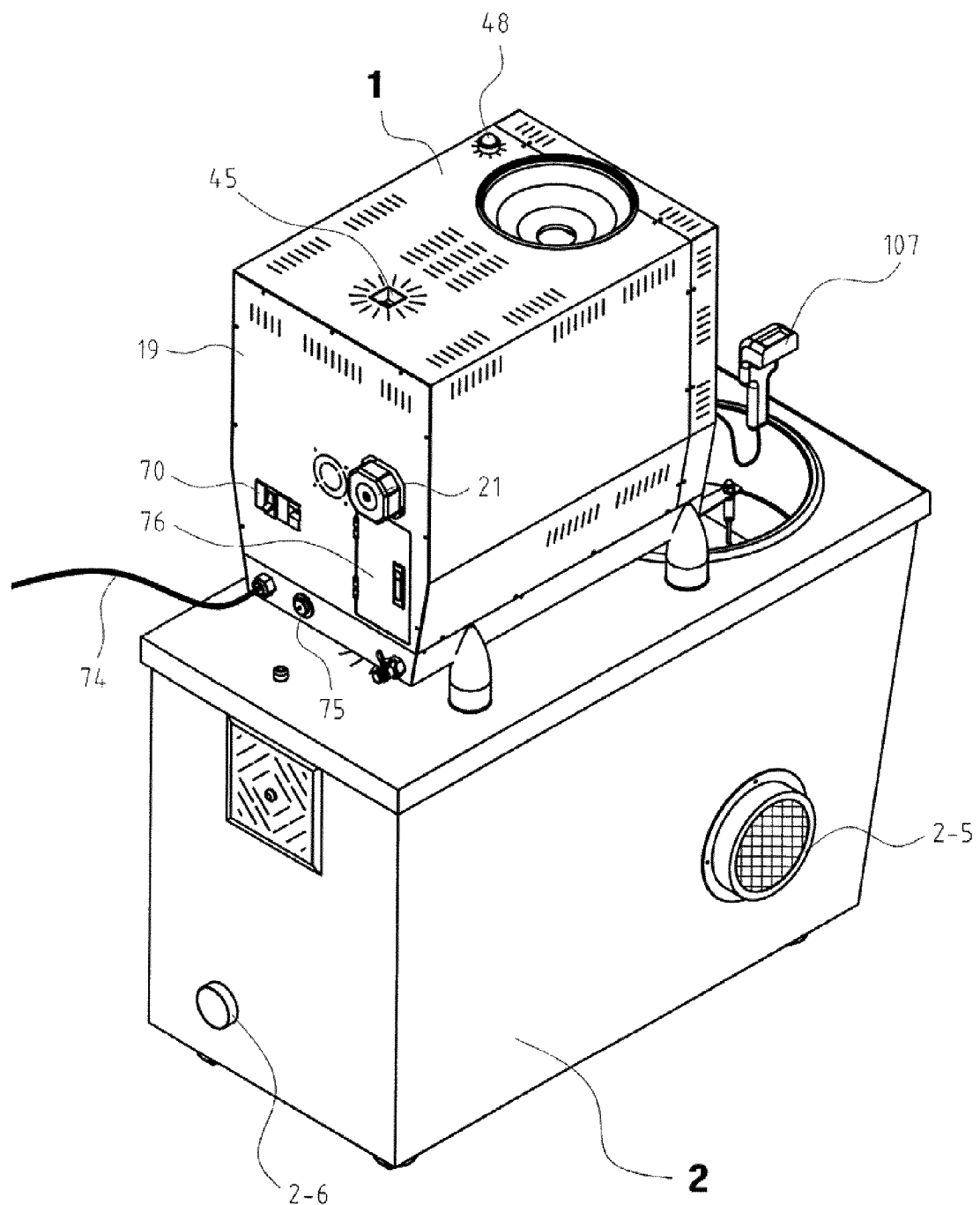
FIG. 2 is a rear perspective view of FIG. 1.
Figure 3:
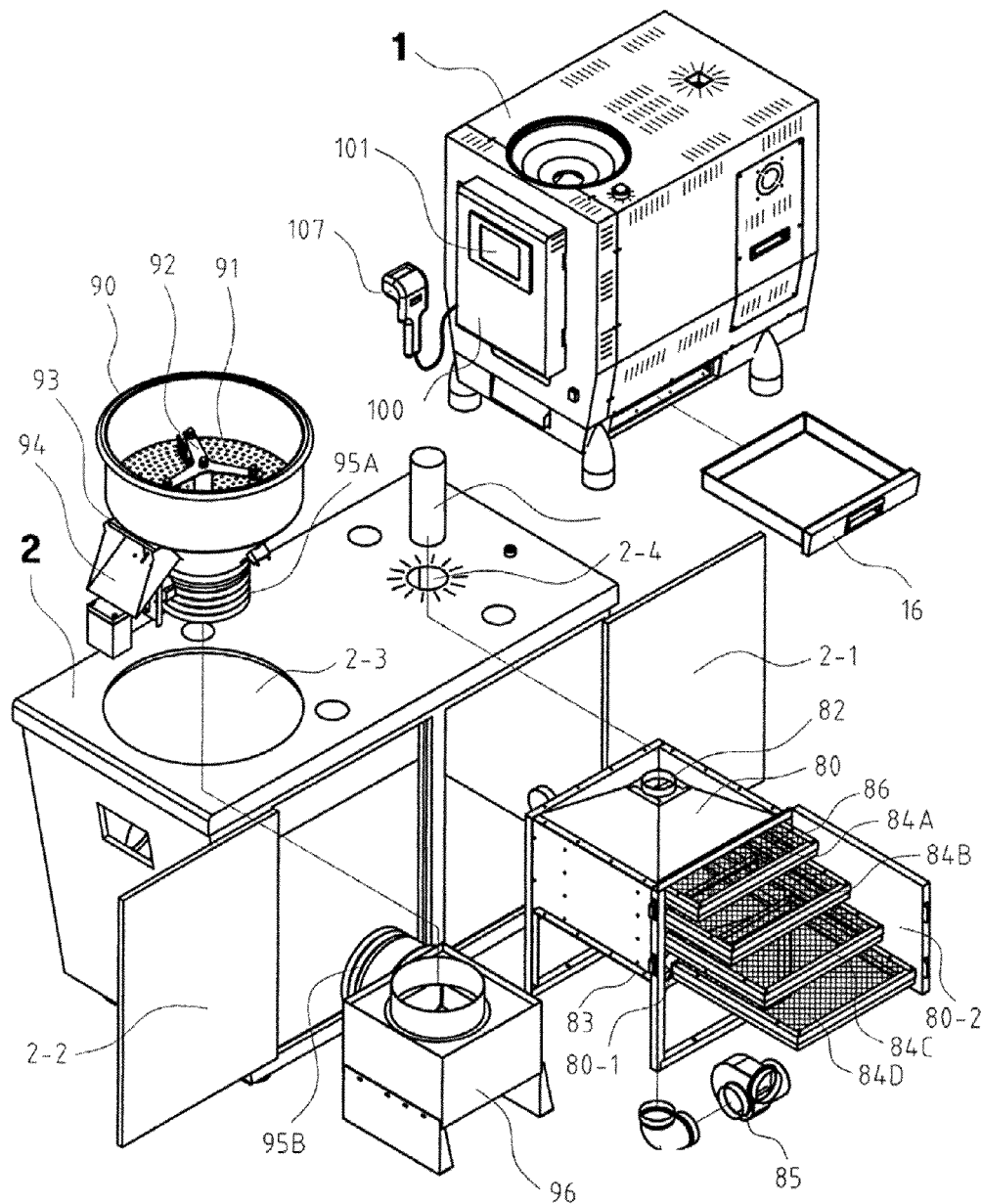
FIG. 3 is an exploded perspective view showing a cooler and a smell eliminator of the cooling table assembly according to the present invention.
Figure 4:
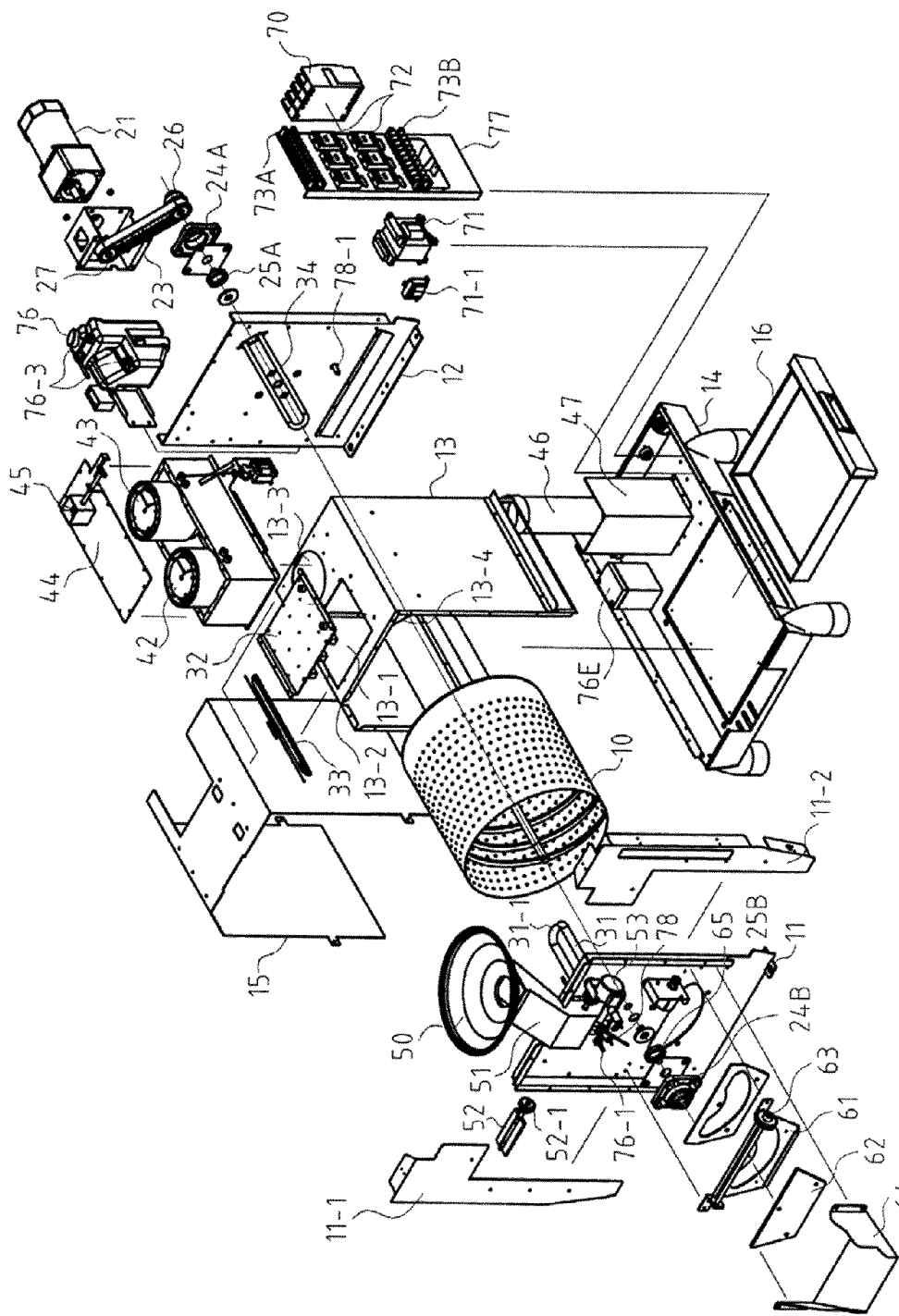
FIG. 4 is an exploded perspective view showing assembly of an exemplary coffee roaster according to the present invention.
Figure 5:
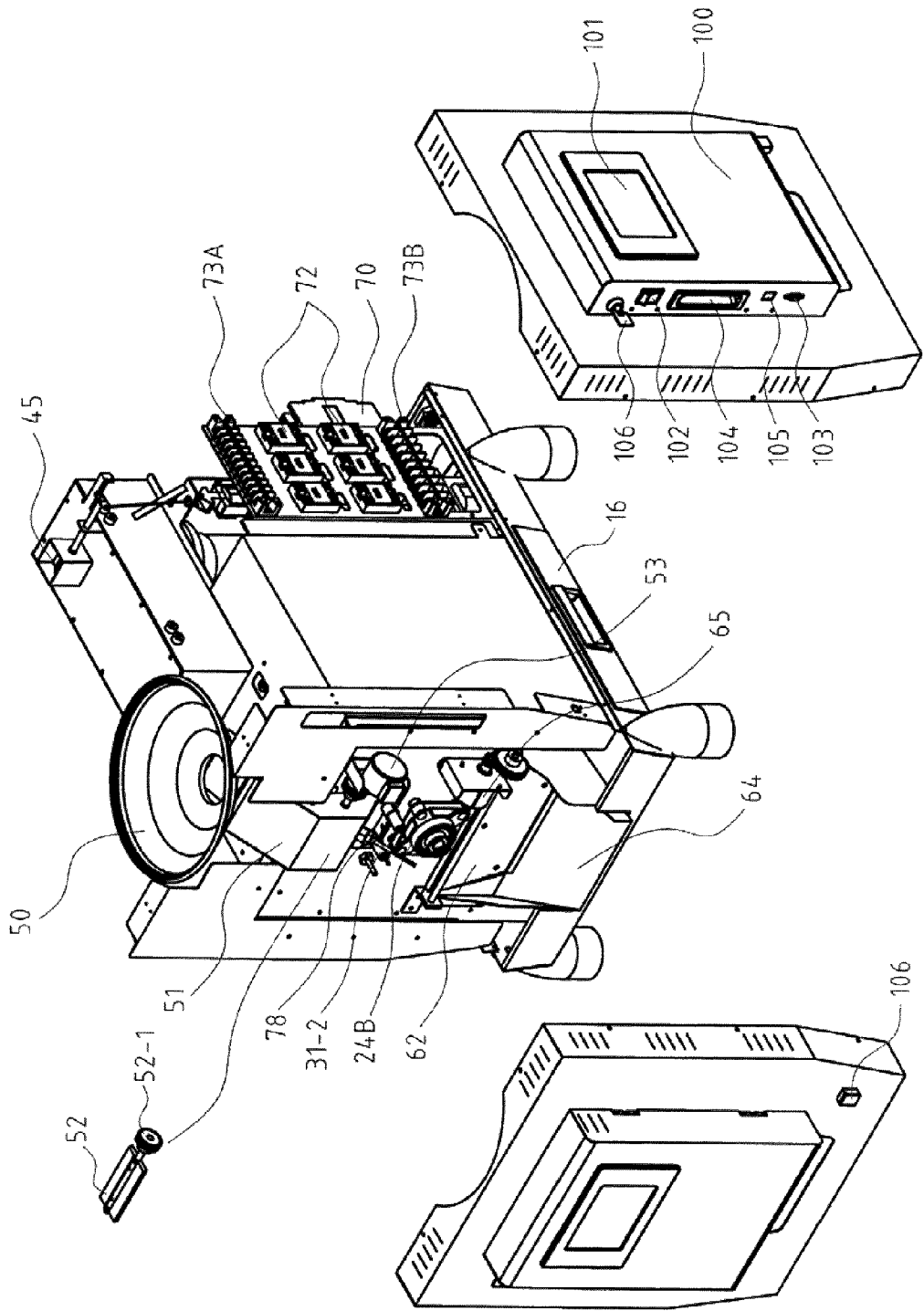
FIG. 5 is a front right exploded perspective view showing the inside of an exemplary coffee roaster according to the present invention.
Figure 6A:
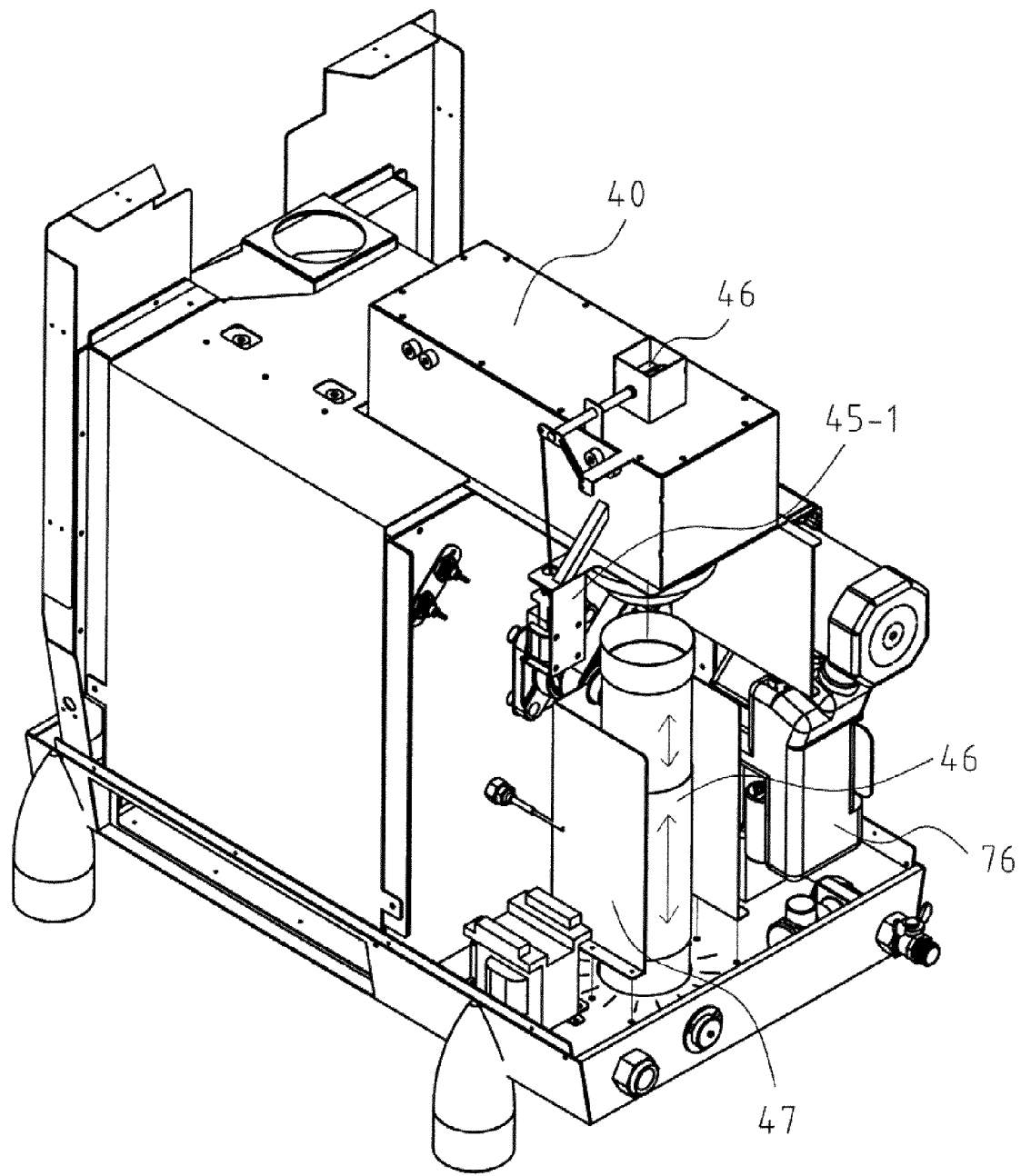
FIGS. 6A and 6B are an exploded perspective view showing an installed smoke eliminator assembly and a rear left perspective view showing the inside of the smoke eliminator assembly, respectively.
Figure 6B:
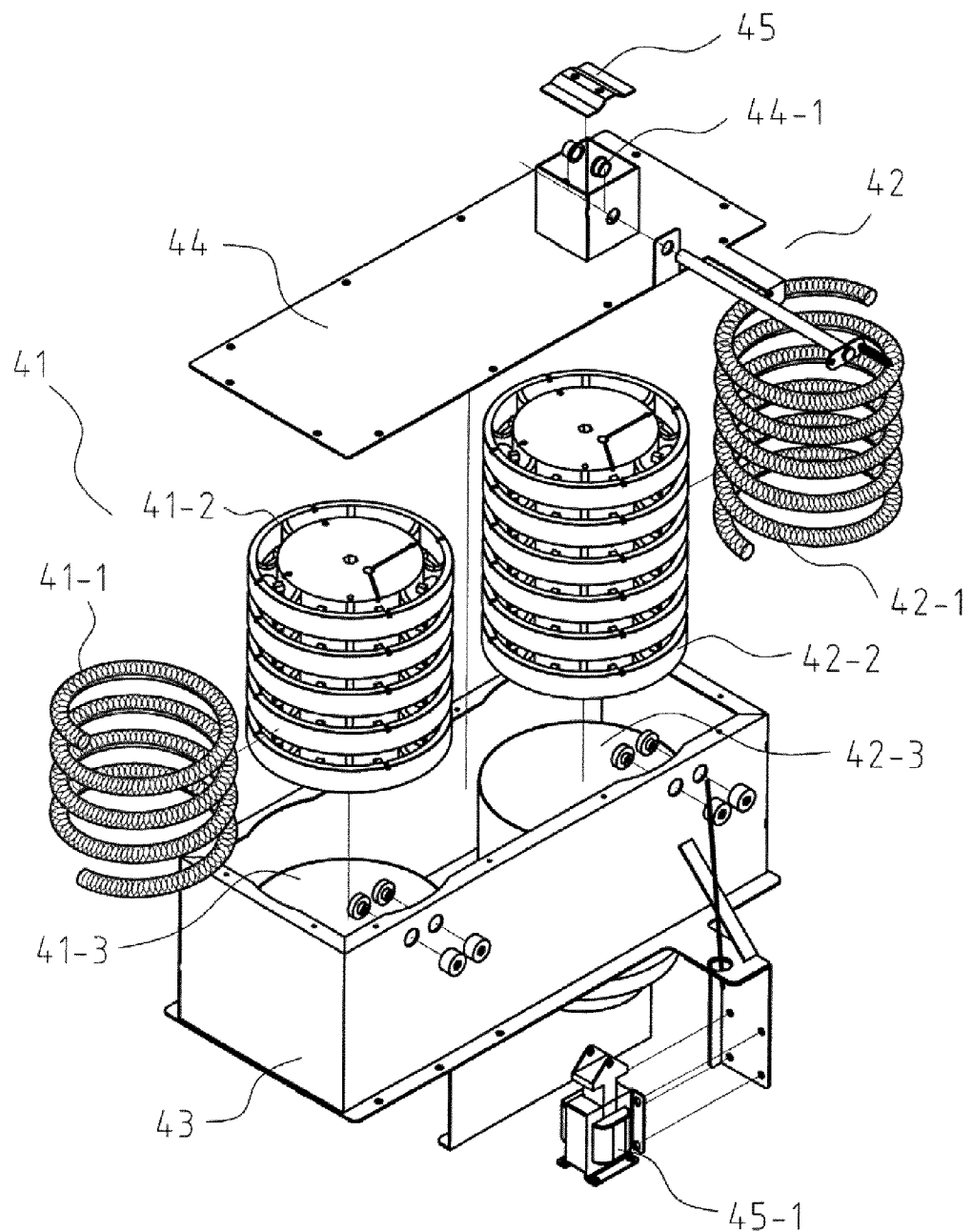
Figure 8:
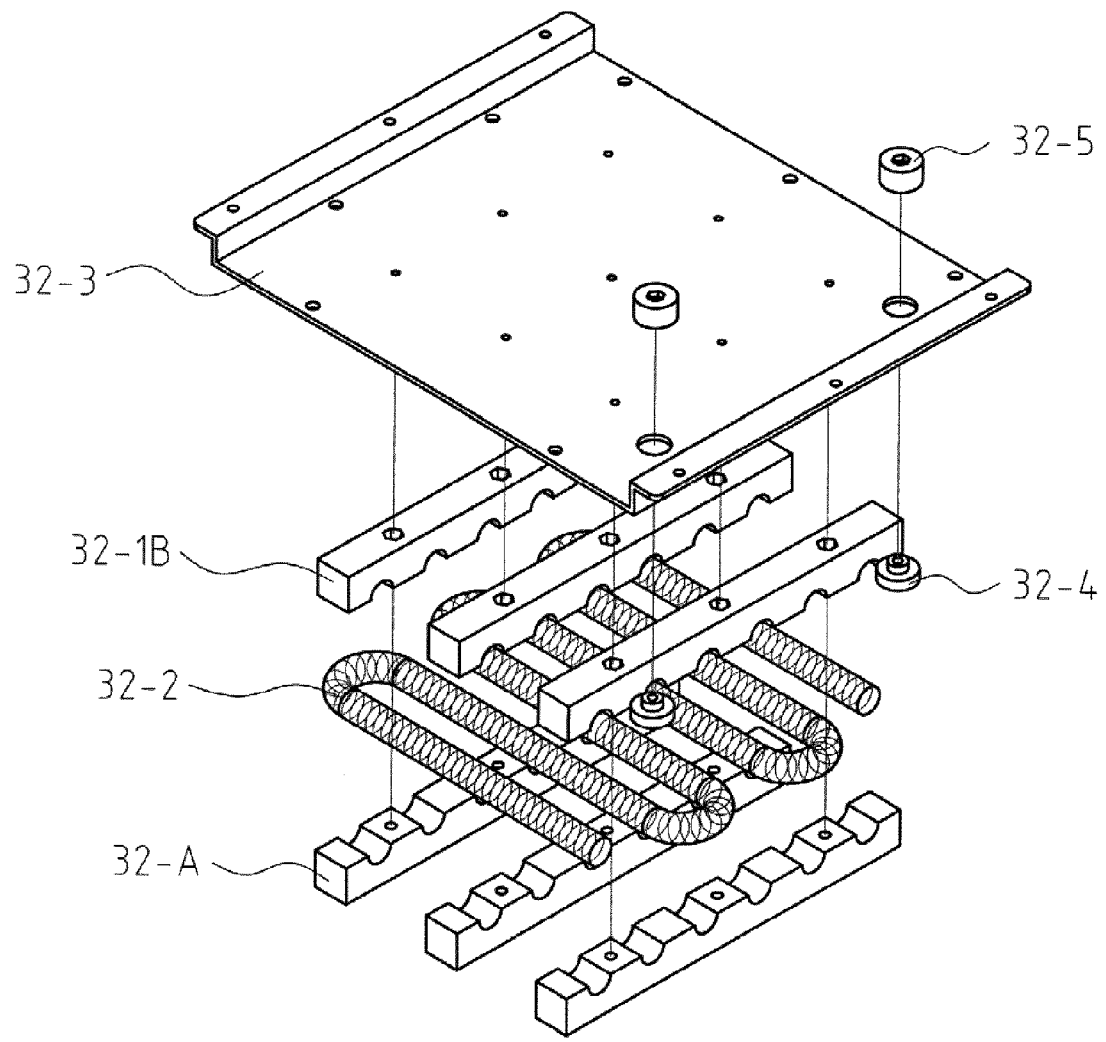
FIG. 8 is an exploded perspective view showing an upper side of an open air coil heater of the coffee roaster according to the present invention.
Figure 9:
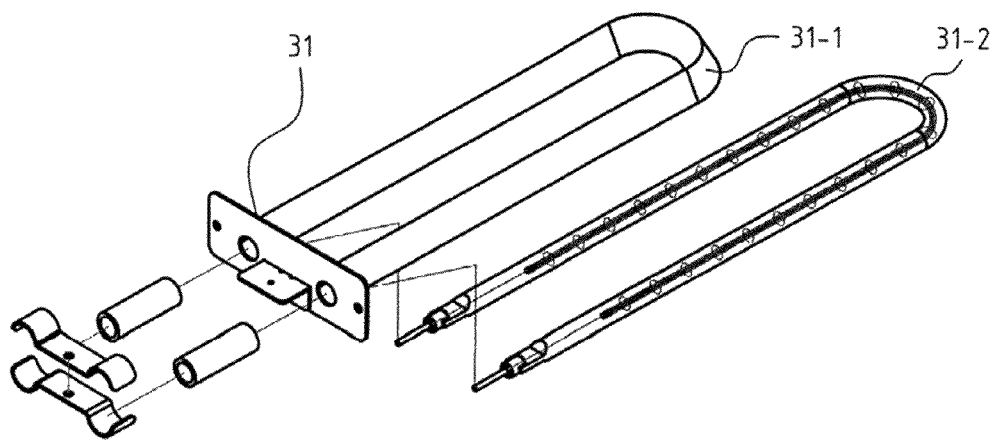
FIG. 9 is an exploded perspective view showing a halogen lamp heater of the coffee roaster according to the present invention.
Figure 10:
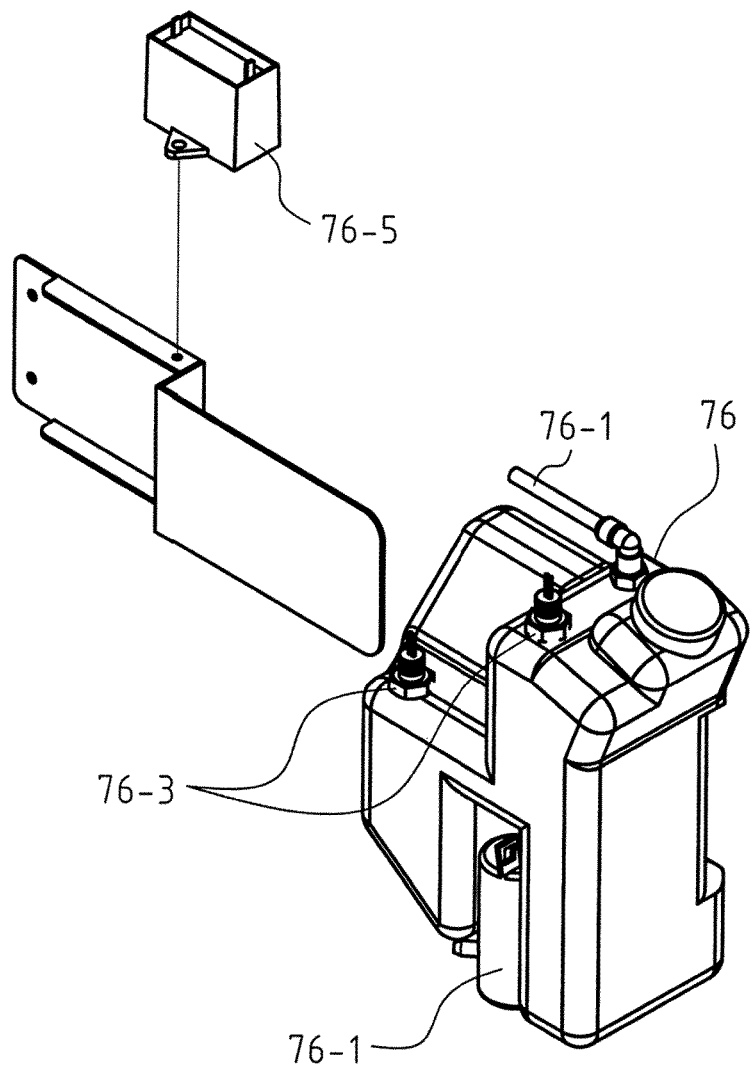
FIG. 10 is an exploded perspective view showing a water tank assembly of the coffee roaster according to the present invention.
Figure 11:
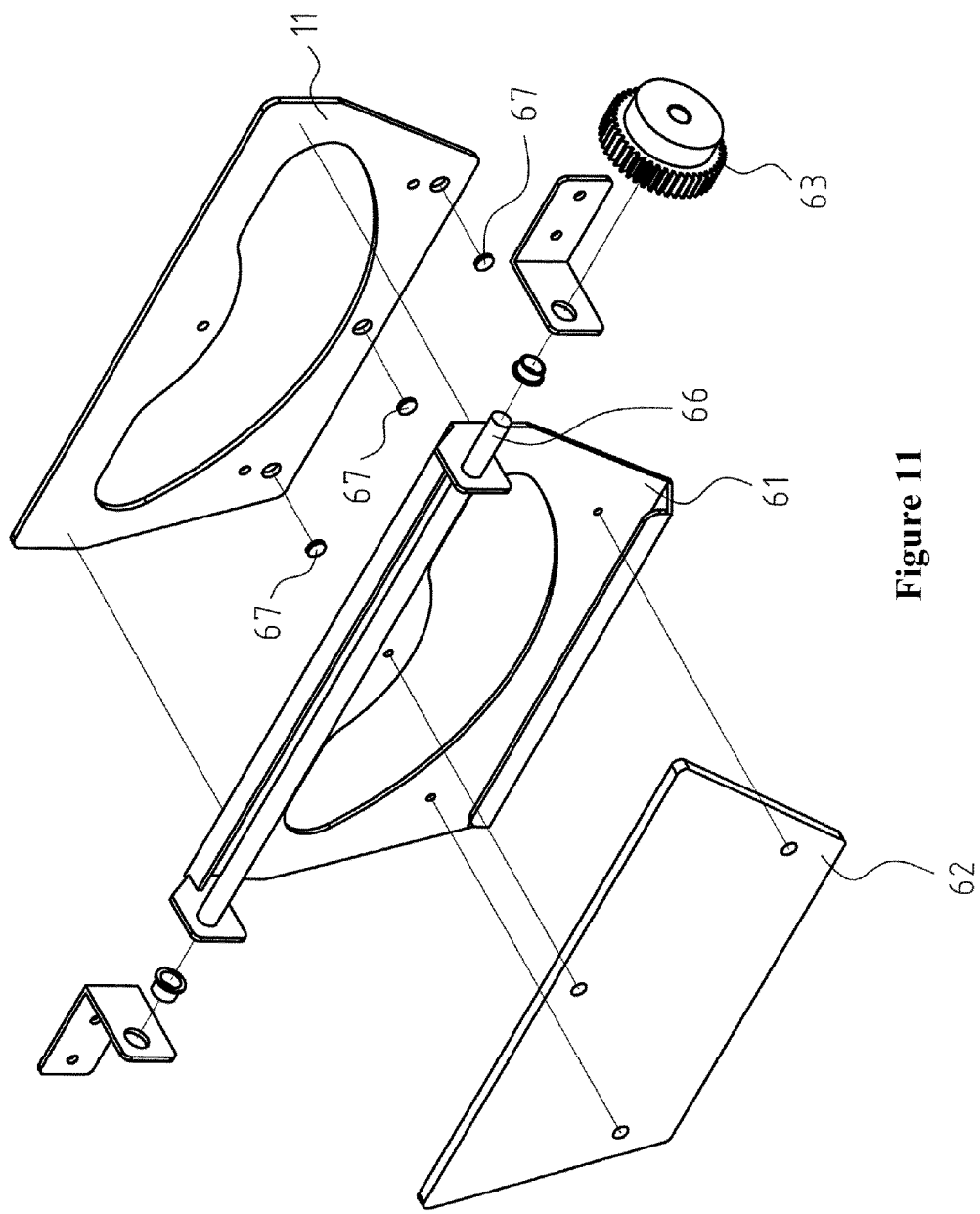
FIG. 11 is an exploded perspective view showing a roasted bean outlet of the coffee roaster according to the present invention.
Figure 12:
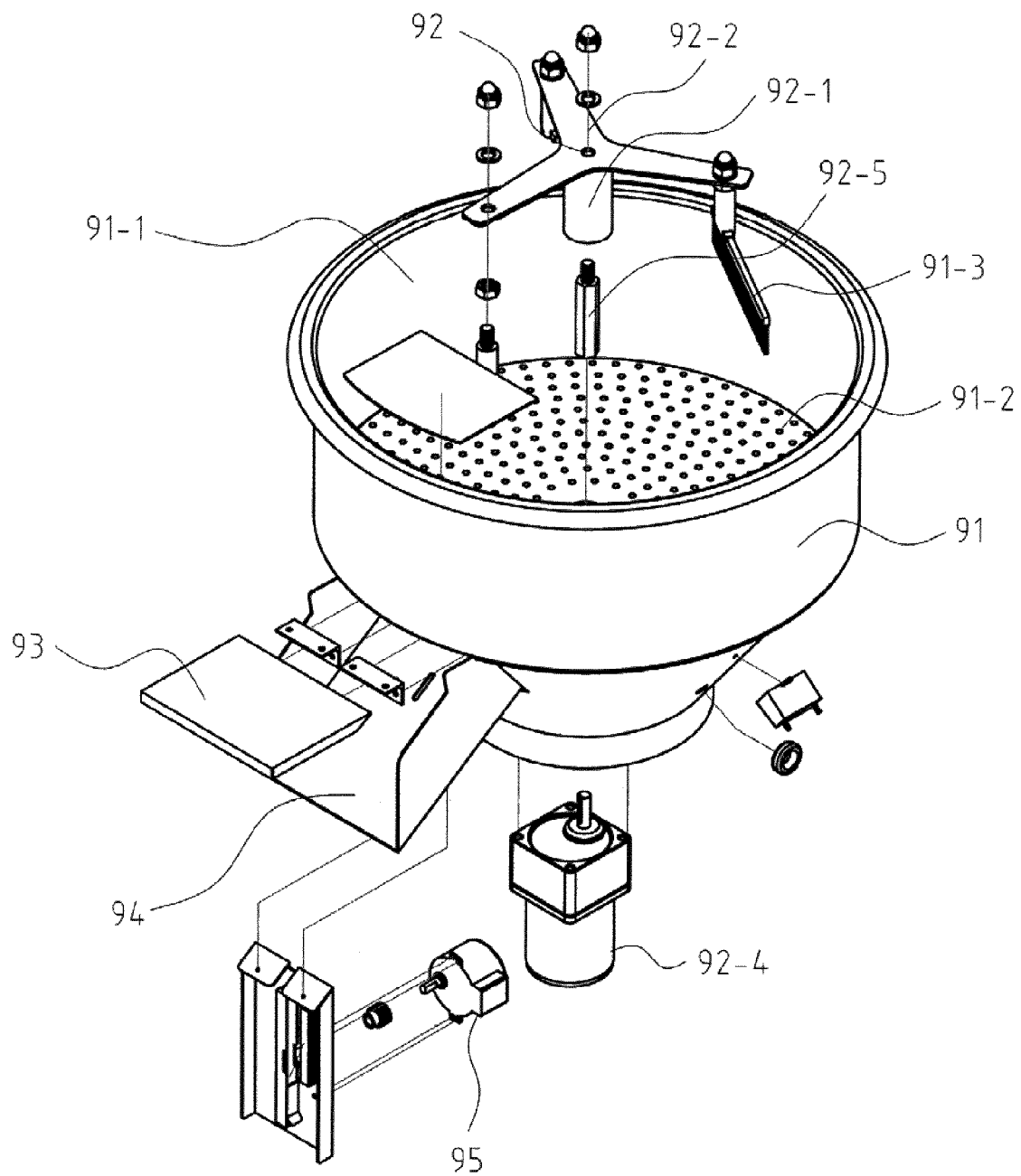
FIG. 12 is an exploded perspective view showing a cooling unit of the cooling table assembly according to the present invention.
Figure 13:
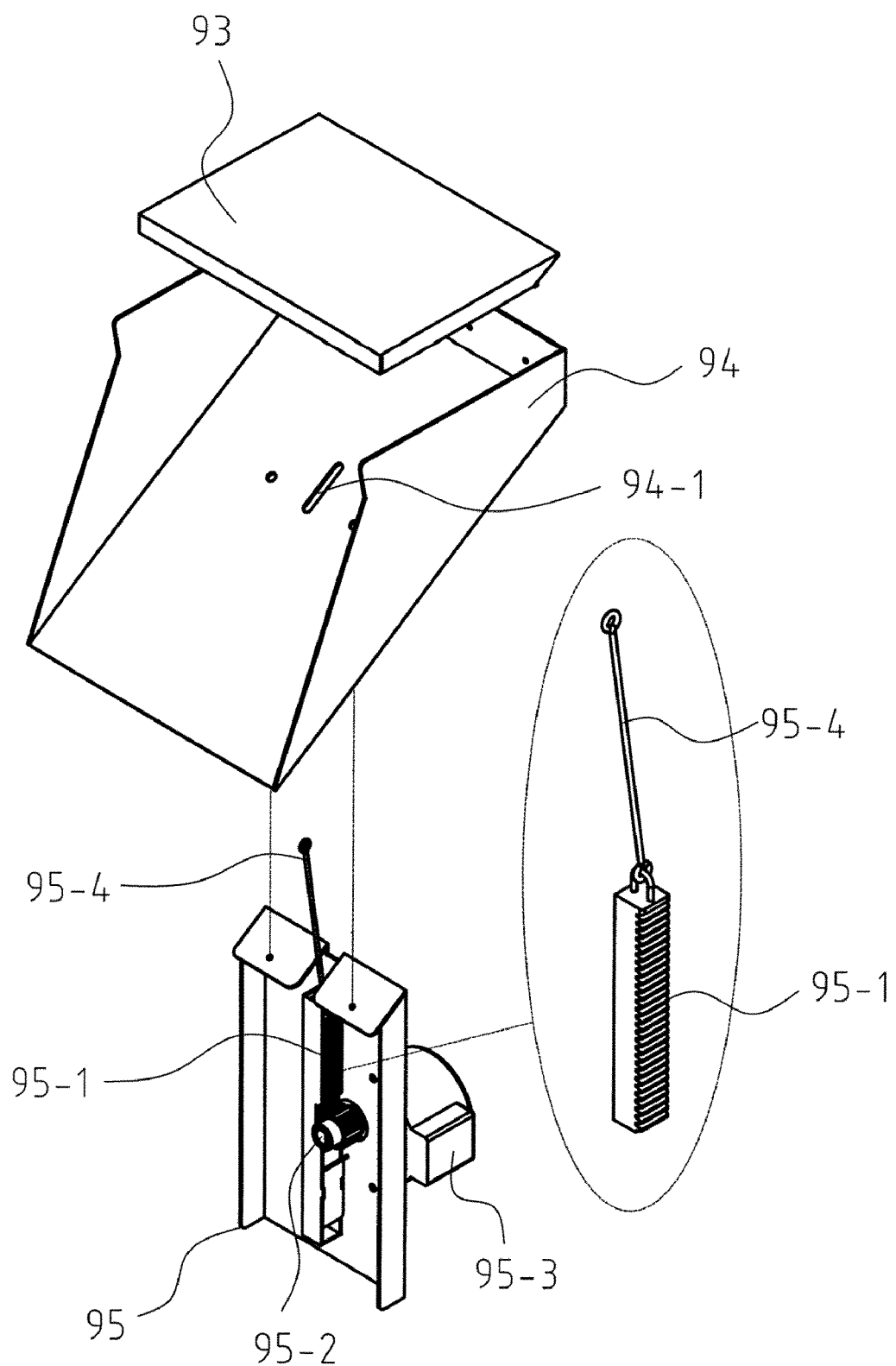
FIG. 13 is an exploded perspective view and a partially enlarged perspective view showing a cooled bean outlet door opener shown in FIG. 12.

FIG. 1 is a front perspective view showing a respective constitution of a coffee roaster assembly and a cooling table assembly according to the present invention, FIG. 2 is a rear perspective view of FIG. 1, FIG. 3 is an exploded perspective view showing a cooler and a smell eliminator of the cooling table assembly according to the present invention, FIG. 4 is an exploded perspective view showing a constitution of the coffee roaster assembly according to the present invention, FIG. 5 is a front right exploded perspective view showing the inside of the coffee roaster assembly according to the present invention, FIGS. 6a and 6b are an exploded perspective view showing the smoke eliminator assembly and a rear left perspective view showing the inside of the smoke eliminator assembly according to the present invention, FIG. 7 is an exploded perspective view showing the smoke eliminator assembly of the coffee roaster assembly according to the present invention, FIG. 8 is an exploded perspective view showing an upper side of an open air coil heater of the coffee roaster according to the present invention, FIG. 9 is an exploded perspective view showing a halogen lamp heater of the coffee roaster according to the present invention, FIG. 10 is an exploded perspective view showing a water tank assembly of the coffee roaster according to the present invention, FIG. 11 is an exploded perspective view showing a roasted bean outlet of the coffee roaster according to the present invention, FIG. 12 is an exploded perspective view showing a cooling unit of the cooling table assembly according to the present invention and FIG. 13 is an exploded perspective view and a partially enlarged perspective view showing a cooled bean outlet door opener shown in FIG. 12.

As shown in drawings, a coffee roaster assembly 1 includes a casing 1-1 which forms external appearance, a rotating drum 10 which is installed in the casing 1-1 to roast green beans, a hopper assembly 50 provided at an upper part of a front side of the casing 1-1 to input green beans, a bean chute 51 which is disposed at a lower part of the hopper assembly 50, and a bean shutter 52 which is provided as a gate in a path of the bean chute 51.

The bean shutter 52 is controlled by a control unit 100 to be opened when a temperature within the rotating drum 10 arrives at a predetermined preheating temperature, when a bar code scanner 106 reads a bar code printed on a green bean packing material, or when a wireless reader (not shown) reads information of electronic tag.

The bar code scanner 106 is connected to a USB port or an RS232 installed in the control unit 100 to input bar code information printed on a green bean packing material. Alternatively, an electronic tag having a microchip for storing cooking information and provided at the green bean packing material, and a non-contact wireless reader for reading the cooking information from the electronic tag may be installed in the control unit 100.

The bean shutter 52 is opened and closed by a bean shutter geared motor 53 which can rotate in both clockwise and counter-clockwise directions.

For example, in a scan mode, when scanning the bar code of the green bean packing material with the bar code scanner 106 or when positioning the electronic tag at a frequency region generated from the wireless reader, green bean information (bean data) recoded on the bar code or the electronic tag is input to a microcomputer of the control unit 100, and then preheating is started by a user's operation for starting the roasting. At this time, when arriving at a predetermined preheating temperature, the microcomputer of the control unit 100 displays a message for informing completion of the preheating on a screen and then controls the bean shutter to be opened so that the green beans to be roasted can be entered into the rotating drum 10.

In an auto mode, when selecting a preset roasting profile, a message for entering the green beans is displayed. However, the bean shutter 52 is not opened for incorrect information or used information which was read formerly, that is the bean shutter 52 is opened only when the bar code or the electronic tag is read by the bar code scanner or the wireless reader and also a preheating temperature arrives at a predetermined value.

The rotating drum 10 is rotated by a rotating force from a drive motor 21 fixed on a rear supporting plate 12 by a bracket 23. At this time, the rotating force of the drive motor 21 is transmitted through a pulley 27 and a timing belt 26 to the rotating drum 10.

The rotating drum 10 is in the form of a cylinder, and numerous holes are formed in an outer surface of the rotating drum 10. The control unit 100 sends an operating signal to the drive motor 21 at sufficient intervals of time that inertial force of drive motor is vanished away so that the drive motor can be repeatedly operated in the clockwise and counter-clockwise directions while prevented from being overheated. By the rotation of the rotating drum 10, the green beans can be evenly heated.

In order for the rotating drum 10 to rotate smoothly, heat-resisting bearings 24A and 24B are respectively installed at both ends of the rotating drum 10.

The bearings 24A and 24B are attached to front and rear supporting plates 11 and 12. To prevent a leakage of smoke and hot air from the rotating drum 10, seals 25A and 25B are inserted within the bearings 24A and 24B. Preferably, the bearings 24A and 24B are made of a heat-resisting material.

To apply heat to the green beans within the rotating drum 10, an open air coil heater assembly 32 is installed on an upper end of a drum shield 13 for surrounding the rotating drum 10, and a ceramic heater 33 and a sheath heater 34 are installed on both right and left inclined surfaces of the upper end of the drum shield 13.

As shown in FIG. 8, the open air coil heater assembly 32 includes a heater base 32-3 fixed to the upper end of the drum shield 13, a plurality of lower insulated ceramic bars 32-1B which are disposed in parallel on the heater base 32-3, a plurality of upper insulated ceramic bars 32-1A which are disposed to be opposite to the lower insulated ceramic bars 323-1B, and an open air coil heater 32-2 which are installed in grooves formed between the lower insulated ceramic bars 32-1B and upper insulated ceramic bars 32-1A. The lower insulated ceramic bars 32-1B and upper insulated ceramic bars 32-1A are fastened to the heater base 32-3 through bolts 32-4 and nuts 32-5.

And, a halogen lamp assembly 31 is provided at a front part 11 to be positioned on a central upper part within the rotating drum 10. By directly heating the green beans with the halogen lamp heater 31, roasting efficiency is maximized.

As shown in FIG. 9, the halogen lamp assembly 31 has a reflector 31-1 for covering an upper side of an U-shaped halogen lamp heater 31-2 made of a glass tube to transfer heat and radiant light to the beans positioned in a lower part within the rotating drum 10. The reflector 31-1 also serves to protect the glass tube from the beans dropped within the rotating drum 10 and to prevent a heat loss at the upper part of halogen lamp heater 31-2 by reflecting light generated from the halogen lamp heater 31-2 downwardly.

In the embodiment of the coffee roaster according to the present invention, there are provided four heaters. The halogen lamp assembly 31 provides the heat of the permeable light to the inside of the rotating drum 10 so that the beans are roasted uniformly, and the open air coil heater 32-2 firstly heats and burns the smoke. Further, the open air coil heater 32-2 serves to heat air at the upper part of the rotating drum 10 and thus to increase the inner temperature of the rotating drum 10.

The sheath heater 34 is installed on the left inclined surface of the upper end of the rotating drum 10 to heat the rotating drum 10. Therefore, when the beans enter into the rotating drum 10, the heat is indirectly transferred to surfaces of the beans so that oil runs out of the coffee beans, thereby improving a taste for coffee.

Furthermore, the ceramic heater 33 is installed on the right inclined surface of the upper end of the rotating drum 10 to prevent a rapid decrease in the inner temperature of the rotating drum 10 when supplying voltage is changed.

If the beans within the rotating drum 10 are heated, the beans are expanded and then shells thereof are peeled and the smoke is generated.

The peeled shells are dropped through numerous holes having a diameter of about 4 to 5 mm formed in a hole plate 10-1 of the rotating drum 10 and then are piled up in a shell drawer 16. The shell drawer 16 is disposed at a lower side of the rotating drum 10 to be separated in a sliding manner.

At this time, the smoke is rising up through the holes of the hole plate 10-1 of the rotating drum 10. Then, the smoke is firstly burned and heated by the lower open air coil heater assembly 32 which is mounted in an opening 13-1 formed at an upper surface of the drum shield 13. Then, the smoke enters into a smoker eliminator 40 via holes 13-3 of the drum shield 13.

As shown in FIGS. 4 and 7, the smoke eliminator 40 includes a first step smoke eliminator assembly 41, a second step smoke eliminator assembly 42 and a vapor shutter 45. The smoke is completely burned while passing through the two heater assemblies.

The first step smoke eliminator assembly 41 and the second step smoke eliminator assembly 42 are installed in a smoke eliminator case 43, and the vapor shutter 45 is disposed at an vapor exhaust 44-1 which is formed at a smoke eliminator cover 44 for covering the first step smoke eliminator assembly 41 and the second step smoke eliminator assembly 42.

Meanwhile, when roasting the green beans, moisture (generally, 12 to 15% of the weight of the green beans) generated from the green beans is vaporized and then generates steam. The rotating drum 10 is filled with the generated steam and then the pressure within the drum 10 is increased. Thus, it is required to properly discharge the steam from the rotating drum 10. To this end, there is provided an exhaust vent fan 85 which is installed in a lower exhaust hole 83 formed at a lower side of a deodorizer 80.

At this time, if the exhaust vent fan 85 is operated at an early stage of the roasting, the roasting is not performed satisfactorily by a large heat loss. However, if the exhaust vent fan 85 is not operated, the steam is accumulated in the rotating drum 10 and then discharged through an exhaust hole of deodorization 2-6 when the exhaust vent fan 85 is operated, and thus the steam may be mistaken for the smoke.

As shown in FIG. 7, the steam is partially removed by the heat while passing through the first step smoke eliminator assembly 41. Meanwhile, a control solenoid 45-1 is installed at the vapor shutter 45 to be controlled by the microcomputer of the control unit 100. The control solenoid 45-1 controls the vapor shutter 45 to discharge and shut the steam.

Meanwhile, a lower end of the second step smoke eliminator assembly 42 of the smoke eliminator 40 is connected through a connection pipe 46 to an upper suction hole 82 which is installed on an upper side of the deodorizer 80.

A heat isolation wall 47 is installed at a circumference of the connection pipe 46 to prevent a trouble due to the hot air radiated from the smoke eliminator 40.

As described above, the generated smoke is almost burned out by the smoke eliminator 40 and the deodorizer 80. However, the smoke among the beans also has to be removed.

Therefore, water is sprayed to the coffee beans so that the smoke among the beans rises upwardly. Then, the risen smoke is completely burned while passing through the smoke eliminator 40 and the deodorizer 80.

The construction for spraying water, as shown in FIGS. 4 and 10, includes a water tank assembly 76 for storing water, a water pump assembly 76-2 for forcibly moving the water stored in the water tank assembly 76 and a spray nozzle 76-1 for spraying the water to the beans within the rotating drum 10.

Moreover, in order to automatically supply water to the water tank assembly 76, a separate water valve (not shown), a solenoid value assembly 76-3 and a floating switch 76-5 may be selectively provided.

If there is the tap water in the neighborhood of the coffee roaster assembly 1, a water supplying pipe is connected to the water valve (not shown) provided at a rear side of the coffee roaster assembly 1. In this state, if signal power is applied to the solenoid valve 76-3 for spraying water, the solenoid valve 76-3 is opened and thus water is supplied to the water tank assembly 76. And if water is filled to an upper part of the water tank assembly 76, the floating switch is turned off and the solenoid valve 76-3 is closed.

If there is not the tap water in the neighborhood of the coffee roaster assembly 1, water may be manually supplied to the water tank assembly 76, for example, by using a kettle. The amount of water is automatically set by a program of the control unit 100. The spraying of water prevents a damage of the activated carbon and increase deodorizing efficiency. This control process is operated by the microcomputer.

When roasting coffee beans, unpleasant smell is generated. To remove the smell, the deodorizer 80 is installed in the cooling table assembly 2. The deodorizer 80 includes activated carbon cartridges 84A, 84B and 84C. Right and left doors 2-1 and 2-2 are provided at a front surface of the cooling table assembly 2 to open and close the front surface thereof. The deodorizer 80 is sealed from the outside so that the outside air is not flown therein and further includes a front door 80-2 and a plurality of guide rails 80-1 for supporting and guiding the activated carbon cartridges 84A, 84B and 84C. The cartridges are filled with activated carbons. The cartridges are arrayed at intervals of 30 to 40 mm. These intervals serve to prevent the activated carbon from the damages due to the heated smoke for roasting the coffee beans and removing the smoke, and heat accumulated in the activated carbon, The smell is removed by the deodorizer 80 in the following manner. If an exhaust vent fan 85 installed in a lower part of the deodorizer 80 is driven according to absorption amount and time which are preset by the control unit 100, the remaining smoke and smell is absorbed and removed by the activated carbon while passing through the activated carbon cartridges 84A, 84B and 84C. The activated carbon cartridges 84A, 84B and 84C have an upper frame and a lower frame which are covered with wire netting to contain the activated carbon. The smoke or gas passes through the wire netting.

After passing through the activated carbon cartridges 84A, 84B and 84C, contaminated air changes is turned into fresh air and then the fresh air is discharged through an outlet of the exhaust vent fan 85 and the exhaust hole of deodorization 2-6 formed in a lower part of the cooling table assembly 2. Thus, according to the coffee roaster of the present invention, the air contamination in a room is prevented, whereby the coffee roaster is possible to be installed in any places in the room.

The activated carbons in the activated carbon cartridges 84A, 84B and 84C are made of coal material. Preferably, the activated carbons have a particle size of 5~10 mm, a packing density of 0.45~0.56 g/ml, a hardness of 90 mm and an iodine adsorption number of 900~100 min.

The smoke removed in the smoke eliminator 40 has very high remaining heat (about 200~250° C.). Therefore, there is the necessity of preventing the damage of the activated carbons due to this high remaining heat. As a first solution of the problem, the control unit 100 controls the deodorizer 80 to remove a proper amount of the steam generated from the moisture of 12 to 15% contained in the green beans, thereby reducing the amount of steam to be burned. As a second solution of the problem, in order to prevent the heat from being accumulated in the activated carbon, a part of the steam generated when roasting beans is completely removed while passing the first step smoke eliminator assembly, and only the gas is discharged to the vapor shutter 45. Other part of the steam is sent to the deodorizer 80 and then removed by the activated carbon. Thus, the damage of the activated carbon is prevented while the remaining smoke and smell are removed.

Meanwhile, in order to correctly roast the beans in the optical state, there are provided a first sensor 78-1 for bean temperature which is disposed at a lower part of the rear supporting plate 12 to measure the temperature of the beans and a second sensor 78 for drum temperature which is disposed at a lower part of the bean chute 51 to measure the temperature of air within the rotating drum 10. According to the present invention, when a crack sound is generated upon applying the heat to green beans, anyone can simply set program according to the measured temperature of the first sensor 78-1 for bean temperature and thus easily roast coffee beans in the optimal state.

If the beans are roasted to have a desired color, the control unit 100 controls a geared motor 65 for roasted bean outlet door to rotate a gear 63 for roasted bean outlet coupled with a rotational shaft 66 of a roasted bean outlet 61, so that the roasted bean outlet 61 is opened. Simultaneously, the rotating drum 10 is rotated in a direction for sliding down the beans. Then, the beans are slid down along a roasted bean chute skirt 64 and then are dropped in a cooling unit 90. As shown in FIG. 11, after discharging the beans, the control unit 100 controls the geared motor 65 for roasted bean outlet door to be driven in a reverse direction so that the gear 63 for roasted bean outlet is also rotated in the reverse direction and thus the roasted bean outlet 61 is closed. The roasted bean outlet 61 installed at the roasted bean chute skirt 64 is provided with a visible door 62.

Further, a rubber packing 68 is attached to a front casing 17 which is contacted with the roasted bean outlet 61, and thus if the roasted bean outlet 61 is closed, an inner space therein is made airtight. The rubber packing 68 is provided with one or more permanent magnet 67. Therefore, when opening the roasted bean outlet 61, the roasted bean outlet 61 is opened only in case that a desired torque is applied, thereby preventing the roasted bean outlet 61 from being unintentionally opened, and when closing the roasted bean outlet 61, the roasted bean outlet 61 is closed easily with a small force.

A hole panel 91 is disposed at an upper part of the cooling table assembly 2 to be positioned at a lower side of the roasted bean outlet 61 so that the beans roasted in the rotating drum 10 are dropped in a cooling unit 90. A ventilation motor 96 is connected with an air suction connector 95-A formed at a lower part of the hole panel 91. Thus, the outside air is flown through the air suction connector 95-A into the hole panel 91 and the fresh roasted beans are rapidly cooled by the outside air.

As shown in FIG. 12, the hole panel 91 is formed with an upper opening 91-1 for receiving the beans discharged through the roasted bean outlet 61, and a bottom surface 91-2 having a plurality of holes through which the outside air sucked by the sirocco ventilation motor 96 is passed. Further, at a lower side of the hole panel 91, there are provided an cooled bean outlet door 93 which controls the discharge of the cooled beans to the outside, and an cooled bean outlet chute 94 which is inclined downwardly to guide the cooled beans discharged from the cooled bean outlet door 93 to the outside. Further, a stirring rotator 92 is disposed at a center part of the hole panel 91 to stir the beans in a circumferential direction and thus to efficiently cool the beans. A cooled bean outlet door opener 95 is disposed at a lower side of the hole panel 91 to open and close the cooled bean outlet door 93.

The stirring rotator 92 has a rod-shaped central shaft 92-1. A lower end of the central shaft 92-1 of the stirring rotator 92 is rotatably fixed to the bottom surface of the hole panel 91. At this time, the stirring rotator 92 is apart from the bottom surface of the hole panel 91 in a desired interval. Three branched parts 92-2 which are horizontally branched at angular intervals of 120 degrees are formed at an upper end of the central shaft 92-1. Each of the branched parts 92-2 has a brush 92-3 for stirring the beans. Further, the lower end of the central shaft 92-1 of the stirring rotator 92 is coupled with a rotational shaft 92-5 connected with a stirring rotator driving motor 92-4.

As shown in FIG. 13, the cooled bean outlet door opener 95 includes a rack gear 95-1 which is vertically disposed to guide the rotation of the cooled bean outlet door 93, a pinion gear 95-2 which is rotatably engaged with the rack gear 95-1, a reversible motor 95-3 for rotating the pinion gear 95-2 in forward and backward directions, and a cable 95-4 of which one end is connected with the cooled bean outlet door 93 and the other end is connected with an upper end of the pinion gear 95-2.

If the reversible motor 95-3 is rotated in the forward direction, the rack gear 95-1 engaged with the pinion gear 95-2 is moved downwardly and thus the cooled bean outlet door 93 is rotated downwardly by the cable 95-4 of which both ends are respectively connected with the rack gear 95-1 and the cooled bean outlet door 93, so that the cooled bean outlet door 93 is opened. On the other hand, if the reversible motor 95-3 is rotated in the backward direction, the rack gear 95-1 engaged with the pinion gear 95-2 is moved upwardly and the cooled bean outlet door 93 is rotated upwardly because tensile force of the cable 95-4 is eliminated, so that the cooled bean outlet door 93 is closed.

The reversible motor 95-3 is electrically connected with the control unit 100 and thus the cooled bean outlet door 93 is automatically opened or closed by the controlling of the control unit 100. The discharged beans through the cooled bean outlet door 93 are collected in a proper container positioned at a lower side of the cooled bean outlet chute 94 and then the roasting process is finished. The cooled bean outlet chute 94 disposed between the cooled bean outlet door 93 and the cooled bean outlet door opener 95 is formed with a groove 94-1 through which the cable 95-4 is passed.

As shown in FIG. 2, a mesh-shaped filter 2-5 is disposed at one side of the cooling table assembly 2. Therefore, it is prevented that the room is contaminated with the peels and scraps remained in the beans within the hole panel 91 when the ventilation motor 96 is operated. The filter 2-5 is detachably disposed at the cooling table assembly 2 to easily replace with new one. To this end, the filter 2-5 may be attached to the cooling table assembly 2 by various fastening means such as screws, bolts and so on.

Meanwhile, the control unit 100 includes a touch screen monitor 101 which is disposed at an upper part thereof and a driving part which is disposed at a lower side thereof to transfer signals from the microcomputer to each parts. An input part having a plurality of buttons is provided on the touch screen monitor 101 of the control unit 100 to adjust the roasting (referring to FIG. 10). The input part is provided with a preheat button. By the operation of the preheat button, the temperature in the coffee roster reaches from an intermediate temperature to a normal roasting temperature within a short time.

The input part is further provided with an extinguishing button. When a fire breaks out in the beans during the roasting, particularly, upon interruption of electric power, the microcomputer of the control unit 100 senses the interruption of electric power and operates the water pump assembly with a charged battery to extinguish the fire.

And the input part is further provided with a cleaning button. The microcomputer of the control unit 100 informs a cleaning time through the monitor 101 and then automatically performs self-cleaning. When performing the self-cleaning, the steam is sprayed twice in the rotating drum 10 to keep the rotating drum 10 clean. In detail, during the self-cleaning, the temperature in the rotating drum 10 is automatically increased to 250~270° C. to burn foreign materials and then to spray the steam in the rotating drum 10, thereby automatically cleaning the inside of the rotating drum 10. The control unit 100 of the coffee roaster may be managed in a status of connecting with a personal computer, and finally managed by a manufacturer through internet using a LAN cable which is connected to a LAN cable port provided in the control unit 100.

Figure 14:
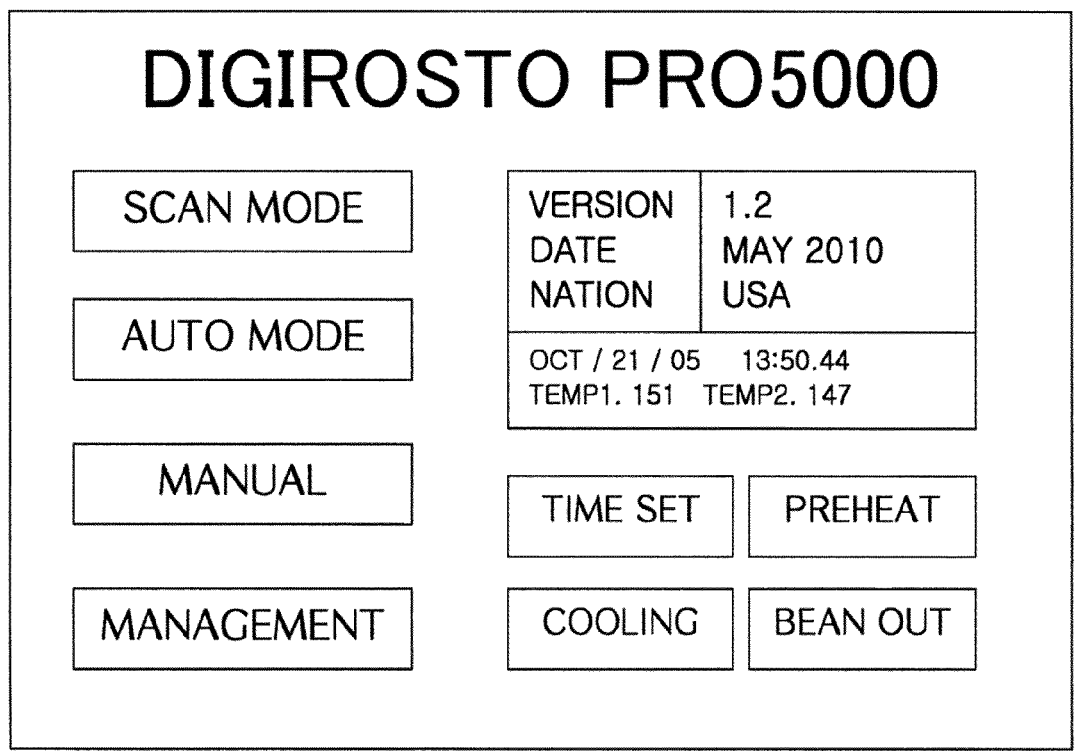
FIG. 14 is a view showing an example of a main image displayed on a touch screen monitor of the coffee roaster according to the present invention.
Figure 15:
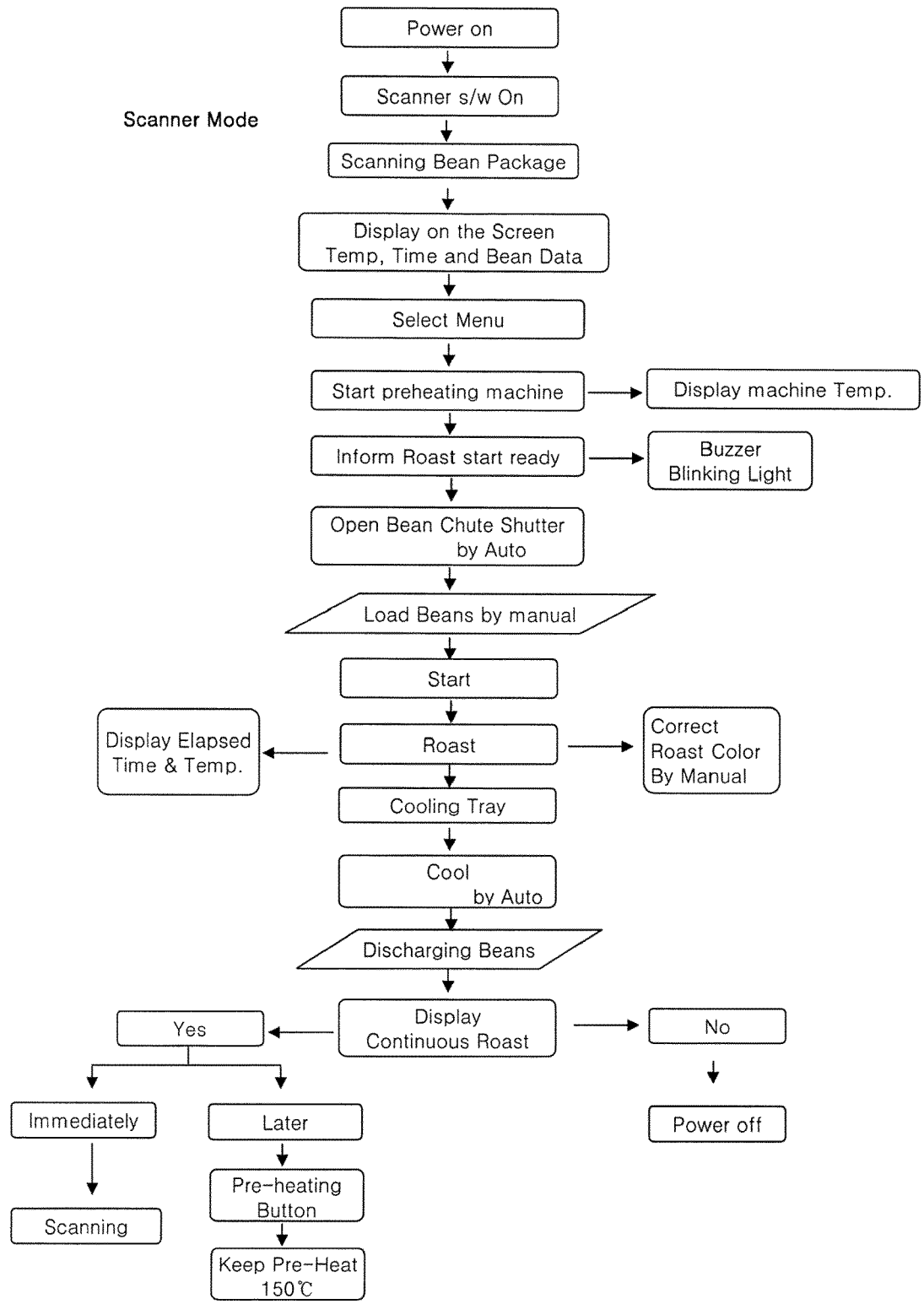
FIG. 15 is a flow chart showing an exemplary roasting process in a scanner mode according to the present invention.
Figure 16:
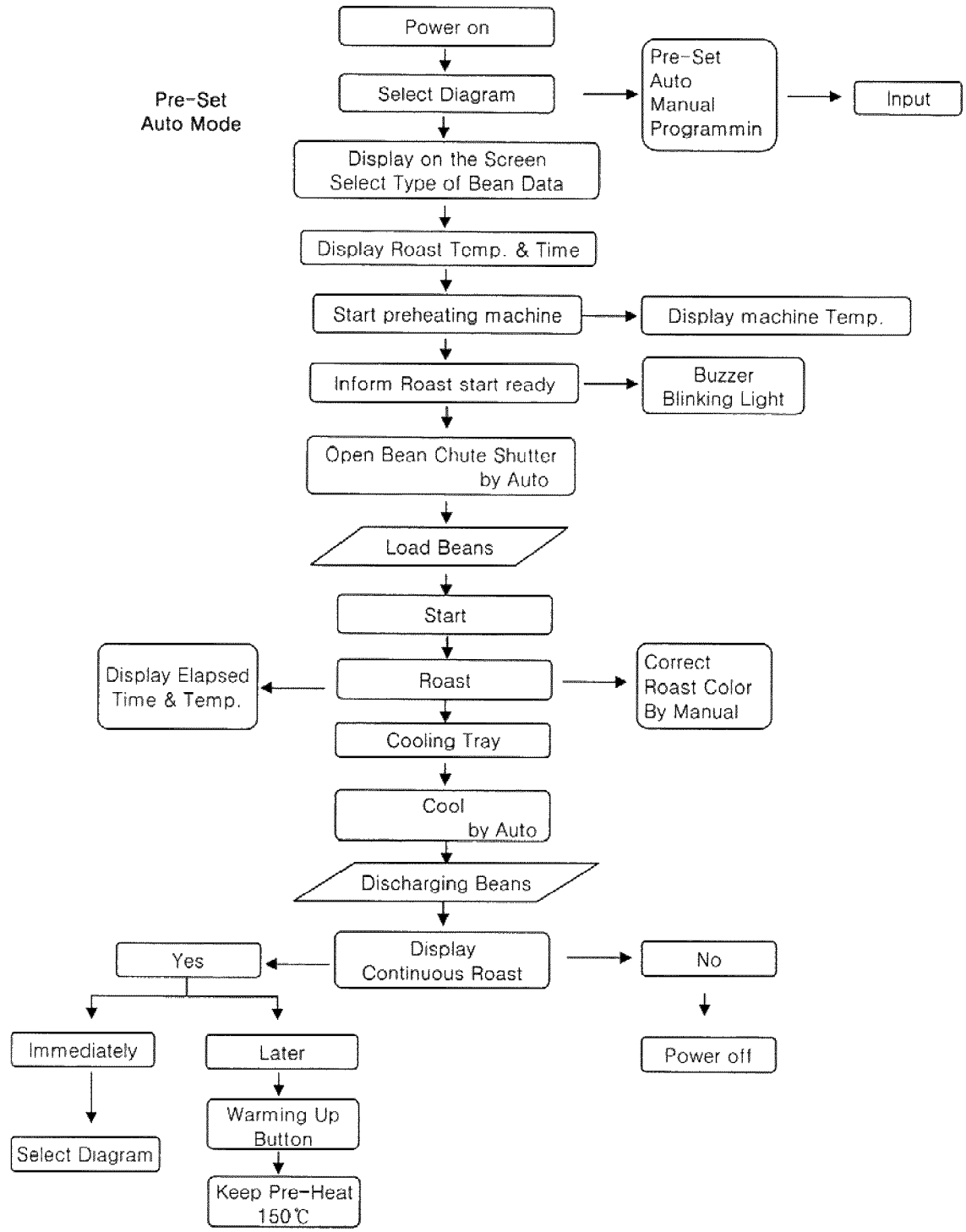
FIG. 16 is a flow chart showing an exemplary roasting process in an auto mode according to the present invention.
Figure 17:
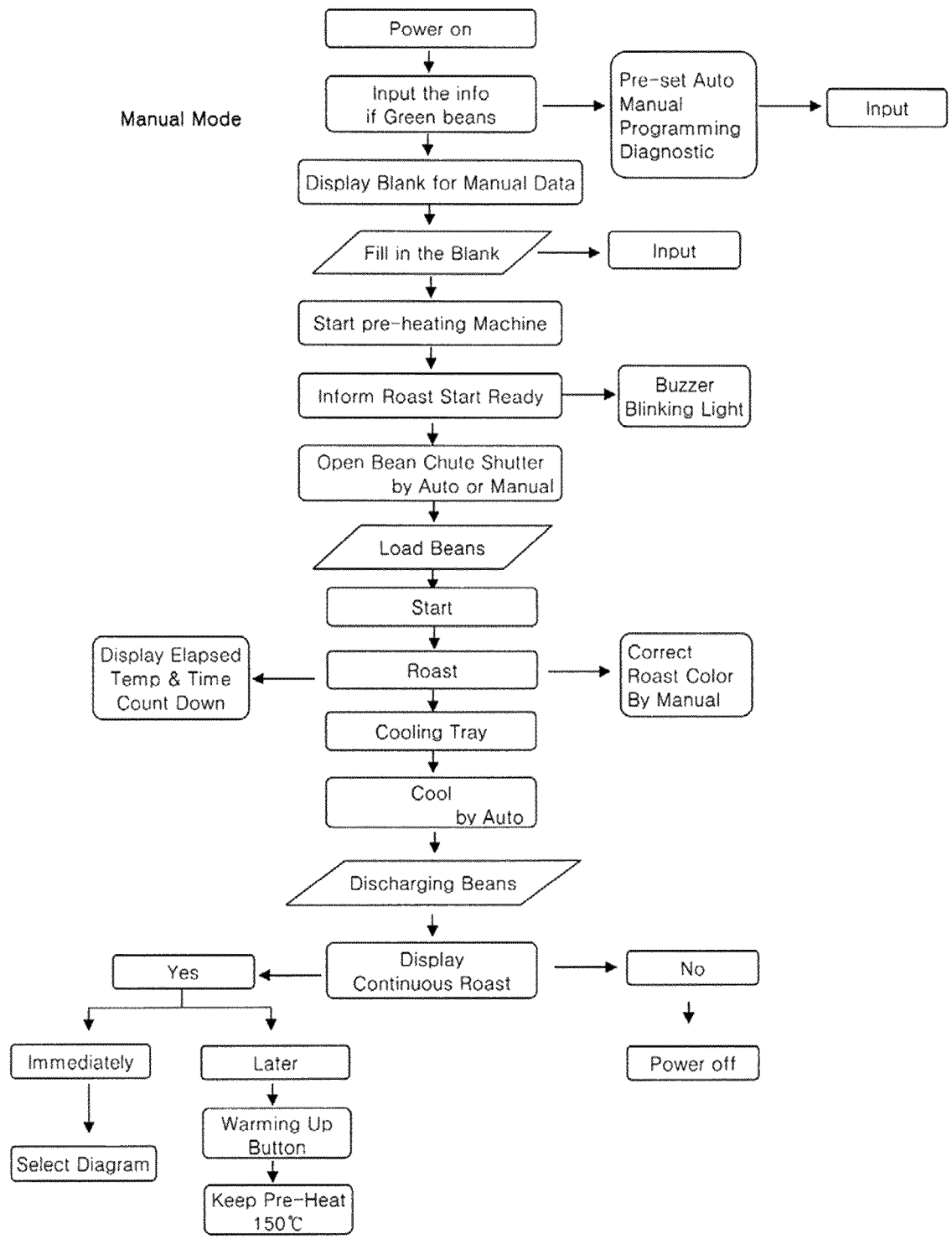
FIG. 17 is a flow chart showing an exemplary roasting process in a manual mode according to the present invention.
Figure 18:
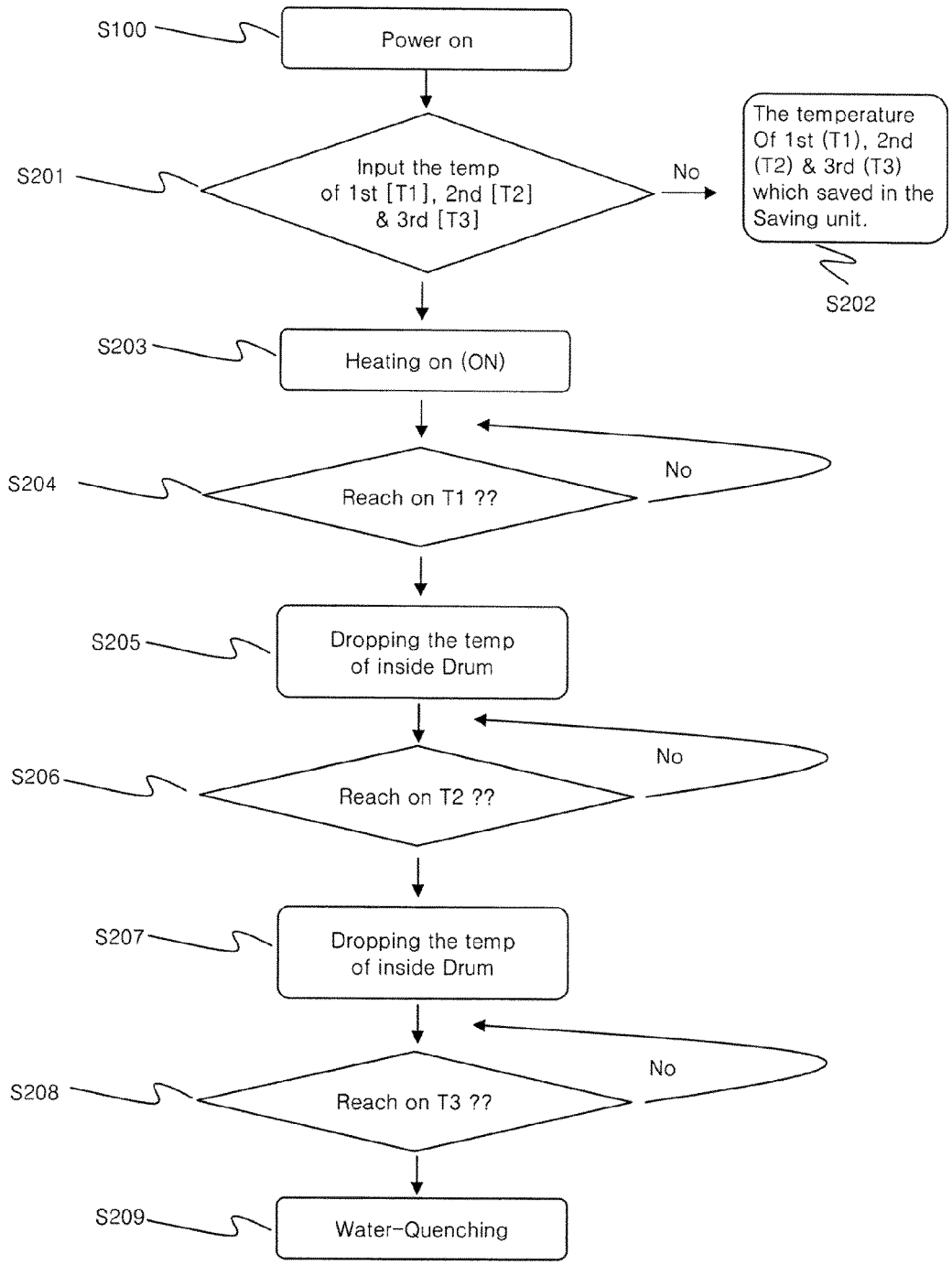
FIG. 18 is a flow chart showing an exemplary roasting control process in the coffee roaster according to the present invention.
Figure 19:
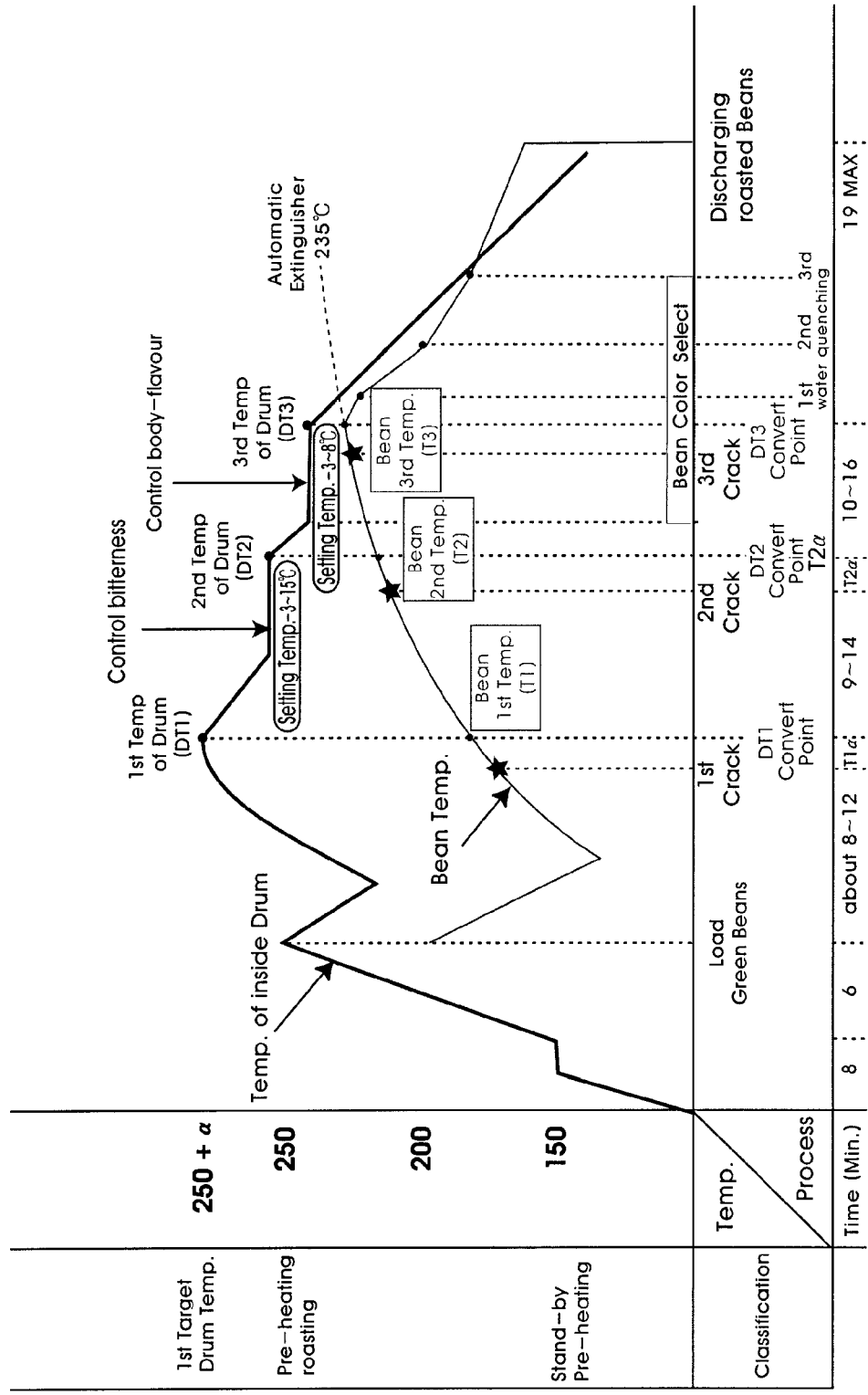
FIG. 19 is a graph showing temperature and time for each roasting stage in an exemplary roasting control process according to the present invention.
Figure 20:
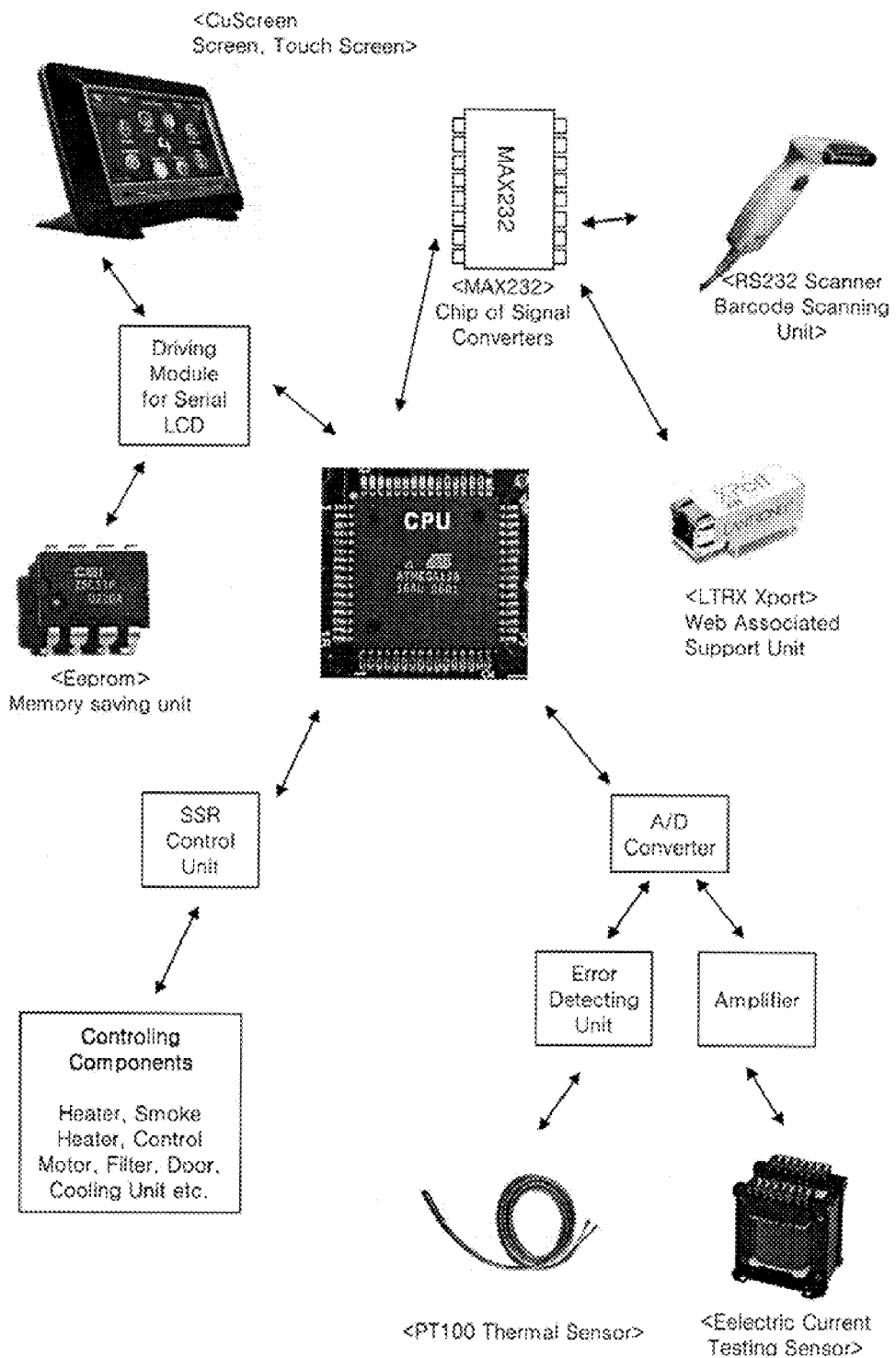
FIG. 20 is an exemplary diagram of components for control of operation of contemplated automated roasters.

Hereinafter, a using process of the coffee roaster according to the present invention will be described with reference to the drawings. FIG. 14 is a view showing an example of a main screen displayed on a touch screen monitor of the coffee roaster according to the present invention, FIG. 15 is a flow chart showing a roasting process in a scan mode according to the present invention, FIG. 16 is a flow chart showing a roasting process in an auto mode according to the present invention, FIG. 17 is a flow chart showing a roasting process in a manual mode according to the present invention, FIG. 18 is a flow chart showing a roasting control process in the coffee roaster according to the present invention, and FIG. 19 is a graph showing a temperature and a time for each roasting stage in the roasting control process according to the present invention.

Firstly, a basic operation like selecting of a roasting mode is performed.

1. SCAN MODE: A scan mode is to scan a bar code or to directly input the code and perform the roasting by using information recorded in the code.

2. AUTO MODE: In this mode, it is possible to perform the roasting by using preset roasting information without a separate setting operation, and it is classified into a presetting mode and a new setting mode.

1) PRESETTING MODE: selects the roasting information previously memorized in the auto mode and then performs the roasting.

2) NEW SETTING MODE: newly creates the information to be used in the presetting mode 3. MANUAL MODE: A user can freely select the roasting process.

4. MANAGEMENT: This menu is to provide various information and troubleshoot the coffee roaster by self-diagnostic or by connecting with a computer. It is classified into an online trouble shooting, a manual trouble shooting, a bean report, a daily report and a download mode.

1) ONLINE TROUBLESHOOTING: connects with a computer of a manufacturer through network and performs the self-diagnostic for the heater, the motor, the solenoid and other parts.

2) MANUAL TROUBLESHOOTING: checks directly the heater, the motor, the solenoid and other parts.

3) BEAN REPORT: shows a kind of bean used by the user, a number of roasting operations and a weight of the beans.

4) DAILY REPORT: displays information for the roasting operations by date.

5) DOWNLOAD MODE: connects with a computer of a manufacturer through network and upgrades a program to a new version.

5. TIME SET: It is possible to correct a time in a built-in watch.

6. PREHEAT: This mode is to be on standby at a standby preheat temperature without the roasting. At this time, the standby preheat temperature keeps 150□.

7. COOLING: The ventilation motor in the cooling table assembly is operated to cool the beans in the cooling table assembly.

8. BEAN OUT: This mode is to extract the beans from the cooling table assembly.

9. CONTENTS OF INFORMATION WINDOW:

1) VERSION: displays a version of the present program.

2) DATE: displays a delivery date of a product.

3) NATION: displays a nation in which the coffee roaster is used.

4) MONTH, DATE, YEAR: displays a month, a date and a year

5) TEMP1: displays a temperature of the first sensor for bean temperature.

6) TEMP2: displays a temperature of the second sensor for drum temperature.

The selecting, operating, setting and inputting of each menu can be performed through the touch screen monitor.

Hereinafter, a roasting method in each mode will be described. In the scan mode, if a bar code is scanned, an electronic tag near is placed near a wireless reader, or a code is directly input, the roasting is performed by using the information recorded in the code. That is, the roasting is performed using the bean information recording in the code (which is preferably physically associated with the green bean package).

FIG. 15 is a flow chart showing a roasting process in a scan mode according to the present invention. In the scan mode, firstly, the power and the bar code scanner 106 or the wireless reader is switched on. The scan mode is selected from a main menu image of the touch screen monitor. Then, a bar code on a green bean packing material is input by using the bar code scanner 106 or the wireless reader. Herein, the bar code may be directly input through a screen of the monitor by touching numeral images displayed after selecting the scan mode. When the inputting of the bean information using the bar code or electronic tag is finished, information of temperature, time and bean to be roasted is displayed on the screen and a preheating process is performed by the operation for starting the roasting.

When arriving at the predetermined preheating temperature, a message for informing the finish of the preheating and instructing to insert the beans is displayed on the screen, a buzzer is turned on and the bean shutter is opened to insert the beans. These operations are all controlled by the control unit 100.

Then, after inserting the beans manually, the user touches a "next" button to start the roasting. If the roasting is finished according to the user's selecting conditions such as a temperature of the rotating drum, first and second crack temperatures, a desired color of the roasted beans and so on, the roasted beans are automatically delivered to the cooling table assembly. The beans in the cooling table assembly are cooled and then discharged to the outside. The auto mode is to perform the roasting by using predetermined roasting information without a separate setting operation. The auto mode is classified into a presetting mode for selecting the roasting information previously memorized in the auto mode and then performing the roasting, and a new setting mode for newly creating the information according to user's taste.

FIG. 16 is a flow chart showing a roasting process in an auto mode according to the present invention. Referring to FIG. 16, when the coffee roaster is delivered to a user at the first time, the contents of the presetting mode is set to basic values. Therefore, to memorize new contents set by the user, the user starts the new setting mode and then inputs and stores the new roasting information. To this end, the user touches, in turn, an "auto mode" button and a "new setting" button on the main image, and then sets a kind of bean, a weight, a desired color of green beans to be roasted, a desired color of the roasted beans, a temperature of the rotating drum, first and second crack temperatures (roasting temperature), a time, etc. Then, if the user starts the roasting, the preheating is firstly performed. The process after the preheating is the same as in the scan mode.

The manual mode allows the user to freely select the roasting process. In this mode, the user can freely control the heater to adjust the temperatures and also change a roasting time. FIG. 17 is a flow chart showing a roasting process in a manual mode according to the present invention. Firstly, the user selects a "manual mode" button and inputs various roasting information such as bean information, a temperature, a time and the like, and then manually operates each heaters to perform the preheating.

Then, when arriving at the predetermined preheating temperature, a message for informing the finish of the preheating and instructing to insert the beans is displayed on the screen, and the buzzer is turned on. The user inserts the beans in the roaster and starts the roasting. After the roasting is finished, as shown in FIG. 13, the roasted beans is cooled and discharged. These processes are also the same as in the scan mode and the auto mode.

Hereinafter, a control process of the roasting will be described with reference to FIGS. 18 and 19. The control process of the roasting is commonly applied to each mode shown in FIGS. 15 to 17. FIG. 19 is a graph showing a temperature and a time for each roasting stage in the roasting control process according to the present invention, wherein a lateral axis represents a green bean treating process and a longitudinal axis represents the temperatures of the green beans and the rotating drum. Firstly, after turning on a main switch of the input part, the roasting is started according to each mode shown in FIGS. 15 to 17 (S100). In the process before the roasting, when the user wants to preheat the roaster before customers come, the user touches a "standby preheat" button after the touch screen monitor is turned on. At this time, the inner temperature of the rotating drum is maintained at a standby preheat temperature of 150° C. Then, if the user starts the roasting after selecting a profile for a kind of bean and a weight of the beans according to the customer's demand, the regular preheating is performed (at 250° C.).

When arriving at the predetermined preheating temperature, a message for instructing to insert the beans is displayed on the screen. At this time, the bean shutter 52 of the bean chute 51 is opened so that the beans are inserted therein. When the user touches the "next" button, the bean shutter 51 is closed and then the roasting is started. After that, the user determines whether the first, second and third temperatures T1, T2, and T3 that the beans will be arrived are input (S201). If the temperatures T1, T2, and T3 are input, the roasting is started by operating the heating means. However, if the temperatures T1, T2, and T3 are not input, the roasting is controlled by the temperatures stored in a memory (S202).

As the heating means, the halogen lamp heater 31-2, the open air coil heater 32, the ceramic heater 33 and sheath heater 34 are operated in turn, and thus the inner temperature of the rotating drum is increased. The beans which are continuously heated by the four heaters are expanded, and crack sound is generated. A point when the crack sound is generated for the first time is called a first crack. The first crack is changed according to a kind of bean and a charged or stored stated. A temperature of the beans in desired time (within one minute) after the first crack is occurred is called a first temperature T1. Herein, the desired time may be variably set according to the user's taste.

Further, even when the heating means are tuned off in turn after the first crack, the beans are continuously heated and the crack is also occurred. A point when the crack sound is generated for the second time is called a second crack, and a temperature of the beans in desired time (within one minute) after the second crack is occurred is called a second temperature T2.

And a third temperature T3 means a temperature that the beans will arrive to perform a final selection in the roasting for starting a process of injecting water in the rotating drum.

Data values of the first, second and third temperatures T1, T2 and T3 are previously stored in the memory. The user may change the data values during the roasting according to a customer's taste.

Graphs for showing the inner temperature of the rotating drum and the temperature of the beans are displayed on the monitor. At this time, if the first and second temperatures (T1 and T2) are displayed, the third temperature T3 as the final temperature for determining the final color of the beans will be displayed.

As described above, these data values of the temperatures may changed by the user, and also the changed data values may be stored as a new program file in the microcomputer of the control unit.

The microcomputer determines whether the data values are input through the input part or stored in the memory and then applies power to the heating means like the halogen lamp heater to heat the beans in the rotating drum to the first temperature (S202).

If the first temperature T1 of the beans heated by the heating means is detected by the first sensor for beam temperature and then transferred to the microcomputer (S204), the microcomputer reduces a first temperature DT1 of the rotating drum to stop the first crack (S205).

A bitter taste of coffee is adjusted by a deviation of reduction in the first temperature DT1 of the rotating drum. That is, if the deviation of reduction in the first temperature DT1 is large, the bitter taste is decreased. To reduce the first temperature DT1 of the rotating drum, other heaters except the ceramic heater 33 is turned off in reverse order and, at the same time, the heat and smoke in the rotating drum is drawn out to the outside by controlling an operation time of the exhaust vent fan 85. The deviation of reduction in the first temperature DT1 of the rotating drum is previously stored in the memory to be capable of roasting the beans in the same state. Further, the deviation of reduction in the first temperature DT1 of the rotating drum can be changed or reset during the roasting by the user. Herein, the first temperature DT1 of the rotating drum means the inner temperature of the rotating drum when the beans arrive at the first temperature T1.

Moreover, according to the present invention, in order to efficiently operate the exhaust vent fan 85, the bean shutter 52 of the hopper assembly 50 is opened so that the heat and smoke can be rapidly drawn out by inflow of outer air through the bean shutter 52.

In the step of S204, though the inner temperature of the rotating drum is reduced, the beans are continuously heated by the ceramic heater 33 and thus the second crack is occurred. The second temperature T2 of the beans is also transferred to the microcomputer by the first sensor for bean temperature (S206).

Like in the step of S205, the microcomputer reduces a first temperature DT1 of the rotating drum to stop the second crack (S207). At this time, a deviation of reduction in the second temperature DT2 of the rotating drum determines the bean's taste. That is, if the deviation of reduction in the second temperature DT2 of the rotating drum is low, the heating temperature applied in the latter half of the roasting determines the oil amount run out of the beans. Also, the deviation of reduction in the second temperature DT2 of the rotating drum is previously stored in the memory to be capable of roasting the beans in the same state. Further, the deviation of reduction in the second temperature DT2 of the rotating drum can be changed or reset during the roasting by the user. Herein, the second temperature DT2 of the rotating drum means the inner temperature of the rotating drum when the beans arrive at the second temperature T2.

When the first and second cracks are occurred, the roasting is basically completed. Then, to determine the taste of coffee, a process of making the color of beans dark is performed. That is, the roasting color comprises a light color, a medium color and a dark color and a pitch color, and each color is also divided into five grades according to the temperature of the roasted beans. Therefore, the roasting color can be always adjusted uniformly.

In the step of S207, it is determines whether the beans arrive at the final third temperature T3 while the inner temperature of the rotating drum is continuously reduced (S208). If the beans do not arrive at the third temperature T3, the beans will be heated continuously. However, if the beans arrive at the third temperature T3, water is injected into the rotating drum (S209). Preferably, the third temperature T3 is the temperature of the beans in the desired time after the third crack sound is generated, and the desired temperature DT3 means the inner temperature of the rotating drum when the beans arrive at the final temperature T3.

If the beans arrive at the final roasting temperature T3, water corresponding to 5% of the weight of the beans is injected in third or fourth times to the beans so that the temperature of the beans does not increased, and then the roasting is finished.

When the water is injected in third or fourth times, steam is generated and thus the smoke among the beans is pushed out by the steam and then delivered to the deodorizer. Therefore, when the beans are delivered to the cooling unit 90, the smoke is not discharged to the room. That is, part of the smoke is completely burned by the heater disposed at the drum shield and the spiral coil heaters of the first and second heater assemblies, and the rest of the smoke is delivered to the deodorizer and completely eliminated.

By the water injected to the beans, the aroma of coffee is richer and the smoke and smell is removed, and a problem in packing the beans due to the expansion of the beans is also solved. The cooling operation in the cooling unit 90 is performed by cool air generated by the sirocco ventilation motor. After placing a container for receiving the roasted beans under the cooling unit 90, the user touches a "bean-out" button displayed on the monitor. Then the cooled bean outlet door opener 95 is opened and the beans are discharged therethrough while stirred by the stirring rotator 92. After the discharge of the beans is completed, the cooled beans outlet chute 94 is automatically closed and the roasting is finished.

According to the coffee roaster of the present invention as described above, the coffee beans can be efficiently roasted by using an electrical heater with very small power consumption and smoke and smell generated when roasting coffee beans is removed, whereby everyone can easily roast coffee beans in the optimum state while maintaining comfortable circumstances in a room. Further, the coffee roaster of the present invention is provided with an equipment for removing the smell and cooling the green beans instead of a separate large-sized equipment so as to be installed at any places and circumstances, and which is provided as a power saving automatic machine like home electronics so that everyone can easily use it.

Further, a coffee roaster of the present invention is made smaller for saving electricity, and in which an electric heater is appropriately disposed so as to be capable of removing the smoke and providing the additional heating, and an open air coil heater, a ceramic heater and sheath heater are disposed at the outside of a rotating drum, and a halogen lamp heater for directly transferring heat to the beans is installed within the drum to increase thermal efficiency.

Further, in the coffee roaster of the present invention, a bent reflector is installed at the upper side of the halogen lamp heater to protect the halogen lamp heater and to reflect light downwardly.

Further, the coffee roaster of the present invention is provided with a multi-step smoke eliminator assembly in which a coil heater is wound up in a spiral shape within a ceramic base so that the smoke generated in the rotating drum is smoothly flown and then completely burned by the temperature (about 700~1000° C.) of the heat coil while passing along the heat coil.

Further, in the coffee roaster of the present invention, water is injected into the rotating drum so that steam is generated by the heat of the rotating drum and the roasted beans, and the smoke is pushed out by the steam and then completely removed by a smoke eliminator and a deodorizer.

Thus, specific embodiments and applications of coffee roasters and methods for control of same have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Furthermore, where a definition or use of a term in a reference, which is incorporated by reference herein is inconsistent or contrary to the definition of that term provided herein, the definition of that term provided herein applies and the definition of that term in the reference does not apply.

What is claimed is:

1. A coffee roaster comprising:
   a casing, and a rotatable drum disposed within the casing and configured to allow roasting of coffee beans;
   a drum shield having a first surface and a second surface that is opposite the first surface, wherein the first surface is configured to at least partially surround an outer surface of the rotatable drum;
   a halogen lamp heater at least partially disposed within in the rotatable drum and configured to allow heating of the rotatable drum and coffee beans, an open air coil heater coupled to the second surface the drum shield, and a ceramic heater and a sheath heater, both coupled to another portion of the drum shield;
   a first sensor at least partially disposed within the rotatable drum and configured to allow measurement of a temperature of the beans;
   a second sensor coupled to the drum and configured to allow measurement of an inner drum temperature of the rotatable drum;
   a memory element configured to store data values of temperatures of the beans and the rotating drum; and
   a control unit configured and programmed to automatically adjust the inner drum temperature via control of at least one of the halogen lamp heater, the open air coil heater, the ceramic heater, and the sheath heater when the temperature of the beans and the rotating drum arrive at the data values.

2. The coffee roaster according to claim 1, further comprising (a) a smoke eliminator coupled to the casing and configured to remove smoke generated from the rotating drum, (b) a deodorizer coupled to the casing via a suction hole and suction fan and configured to allow removal of odors using at least one filter for the deodorizer, and (c) a cooling table comprising a cooling unit for the roasted beans.

3. The coffee roaster according to claim 1 further comprising a drive motor configured to allow rotation of the rotatable drum in clockwise and counter-clockwise direction, and further configured to allow operation of the drive motor in intervals sufficient to prevent the beans from being overheated.

4. The coffee roaster according to claim 1 further comprising a reflector coupled to the halogen lamp heater such as to allow direction of heat generated from the halogen lamp heater downwardly toward the beans in the rotating drum.

5. The coffee roaster according to claim 1, wherein the open air coil heater comprises a heater base coupled to an upper end of the drum shield, a plurality of lower insulated ceramic bars coupled to the heater base, a plurality of upper insulated ceramic bars opposite to the lower insulated ceramic bars, and a heating coil disposed between the lower insulated ceramic bars and upper insulated ceramic bars.

6. The coffee roaster according to claim 2, wherein the smoke eliminator comprises first and second step smoke eliminator assemblies, and optionally a vapor shutter disposed at an upper side of the smoke eliminator to discharge steam, and wherein the smoke eliminator is fluidly coupled to the deodorizer.

7. The coffee roaster according to claim 6, wherein the first and second step smoke eliminator assemblies comprise a multi-layered ceramic base in which a coil heater is disposed in a spiral shape.

8. The coffee roaster according to claim 6, wherein the vapor shutter is provided with a control solenoid configured to be controlled by the control unit such that part of the steam is removed by the heat of the smoke eliminator and the rest is sucked to the deodorizer.

9. The coffee roaster according to claim 2, wherein the at least one filter comprises a plurality of activated carbon cartridges, optionally in a configuration that allows individual removal in a drawer-like manner.

10. The coffee roaster according to claim 2, wherein an exhaust hole is formed at a lower side of the deodorizer such that air deodorized through the deodorizer is discharged.

11. The coffee roaster according to claim 1, wherein a bar code scanner is electronically coupled to the control unit to thereby deliver bar code information from bean packing materials to the coffee roaster, and wherein the control unit is further configured to adjust roasting parameters according to the bar code information.

12. The coffee roaster according to claim 1, wherein a wireless reader is electronically coupled to the control unit to read an electronic tag from bean packing materials, and wherein the control unit is further configured to adjust roasting parameters according to the electronic tag information.

13. The coffee roaster according to claim 11 or 12, wherein the coffee roaster further comprises a hopper assembly coupled to the casing to allow input of green beans, a bean chute coupled to a lower part of the hopper assembly, and a bean shutter that is configured to provide a gate in a path of the bean chute, and wherein the bean shutter is configured to open only when the bar code or the electronic tag is read by the bar code scanner or the wireless reader.

14. The coffee roaster according to claim 1, wherein the coffee roaster further comprises a water injecting mechanism coupled to the rotatable drum, wherein the water injecting mechanism is configured to inject water to the beans in the rotatable drum.

15. The coffee roaster according to claim 2, further comprising a roasted bean outlet and a roasted bean chute skirt for guiding the beans from the rotatable drum to the cooling table, and optionally a geared motor coupled to the roasted bean outlet and electronically coupled to the control unit to control opening and closing of the roasted bean outlet.

16. The coffee roaster according to claim 15, wherein one or more permanent magnets are provided at a front surface of the casing which is in contact with the roasted bean outlet.

17. The coffee roaster according to claim 15, wherein the cooling table has a hole panel which is formed with an upper opening for receiving the beans discharged through the roasted bean outlet, a bottom surface having a plurality of holes for cooling the received beans and a cooled bean outlet door for discharging the cooled beans to the outside, and the hole panel is provided with a stirring rotator for stirring the beans to efficiently cool the beans, and a cooled bean outlet door opener is disposed at a lower side of the hole panel, and the cooled bean outlet door opener comprises a rack gear which is vertically disposed to guide the rotation of the cooled bean outlet door, a pinion gear which is rotatably engaged with the rack gear, a reversible motor for rotating the pinion gear in forward and backward directions, and a cable of which one end is connected with the cooled bean outlet door and the other end is connected with an upper end of the pinion gear.

18. The coffee roaster according to 17, wherein a mesh-shaped filter is detachably disposed at one side of the cooling table assembly to prevent the peels and scraps from being discharged to the outside.

19. The coffee roaster according to claim 1, further comprising a touch screen configured to provide input to the control unit.

20. The coffee roaster according to claim 19, wherein the control unit is configured to inform of a cleaning time via the touch screen to automatically perform self-cleaning, and optionally to increase the temperature in the rotatable drum to 250 to 270° C. and optionally to cause steam to be applied to the rotatable drum.

21. The coffee roaster according to claim 1, wherein the control unit is coupled to a computer to informationally connect a roaster user, a bean seller, and a roaster manufacturer.

* * * * *